United States Patent [19]

Howe

[11] Patent Number: 5,604,540
[45] Date of Patent: Feb. 18, 1997

[54] STRUCTURE AND METHOD FOR A MULTISTANDARD VIDEO ENCODER

[75] Inventor: Bradley Howe, San Jose, Calif.

[73] Assignee: C-Cube Microsystems, Inc., Milpitas, Calif.

[21] Appl. No.: 547,166

[22] Filed: Oct. 24, 1995

Related U.S. Application Data

[62] Division of Ser. No. 389,661, Feb. 16, 1995.

[51] Int. Cl.[6] .................................................. H04N 11/04
[52] U.S. Cl. .............................................. 348/405; 348/441
[58] Field of Search .................................. 348/426, 581, 348/403, 405, 441, 714, 555, 716, 718; H04N 7/01, 9/64, 7/13, 7/30, 7/50

[56] References Cited

U.S. PATENT DOCUMENTS

| | | |
|---|---|---|
| 4,835,612 | 5/1989 | Billing . |
| 5,091,783 | 2/1992 | Miyaguchi . |
| 5,124,692 | 6/1992 | Sasson . |
| 5,153,726 | 10/1992 | Ohishi . |
| 5,251,298 | 10/1993 | Nally . |
| 5,315,388 | 5/1994 | Shen et al. . |
| 5,408,251 | 4/1995 | Kwon . |
| 5,416,523 | 5/1995 | Murakami et al. ..................... 348/405 |
| 5,453,788 | 9/1995 | Matsushima et al. .................. 348/405 |

Primary Examiner—Victor R. Kostak
Attorney, Agent, or Firm—Skjerven, Morrill, MacPherson, Franklin & Friel; Edward C. Kwok

[57] ABSTRACT

A structure and a method for providing a video signal encoder under the MPEG-1 and MPEG-2 standards are provided. In one embodiment, a novel scheme for mapping an image to an external memory allows fetching of video data by either field of frame. In addition, an automatic reload of a DMA channel memory allows automatic fetching of an entire 20×20 luma reference picture area, or a 12×12 chroma reference picture area, while crossing the minimal number of DRAM page boundaries. A novel dequantization instruction in the CPU of the video signal encoder allows efficient oddification of DCT coefficients according to MPEG-1 and MPEG-2 standards.

4 Claims, 17 Drawing Sheets

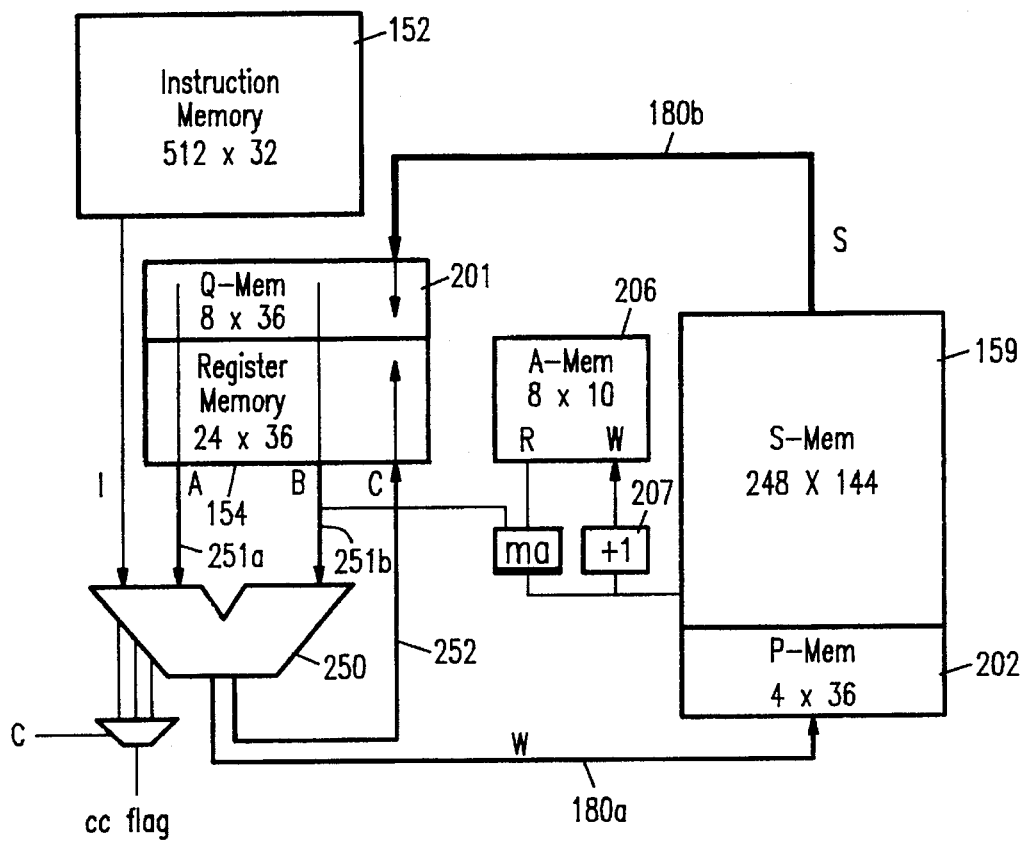
FIG. 2
| 31 | 23 | 22 | | 3 | 2 | 1 | 0 |
|---|---|---|---|---|---|---|---|
| Count − 1 | Ref DMA | DRAM Address | | O/e | | F/f | W/r |
FIG. 3e
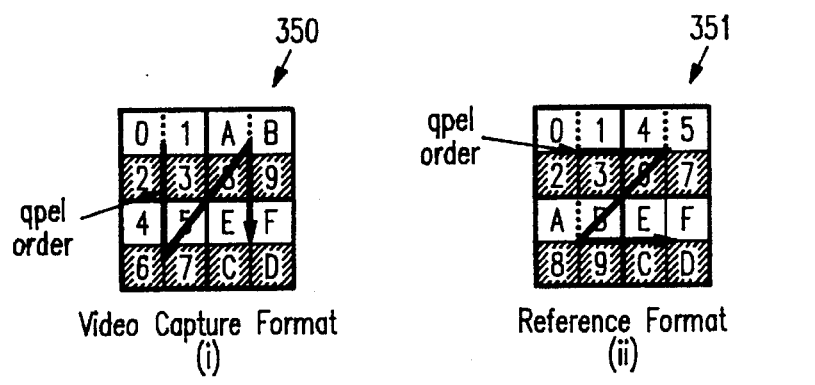
FIG. 3f

FIG. 4d

| | to MData[31:16] | to MData[15:0]* | *MADDR1H=IMADDR1L |
|---|---|---|---|
| 1. | x0 | x2 | |
| 2. | x1 | x3 | |
| 3. | x4 | x6 | |
| 4. | x5 | x7 | |
| 5. | x8 | xA | |
| 6. | x9 | xB | |
| 7. | xC | xE | |
| 8. | xD | xF | |
| . | . | . | |
| . | . | . | |

Table 1a

FIG. 4e

Read as one word

|      | to MData[31:16] | to MData[15:0]* | *MADDR1H=lMADDR1L |
|------|-----------------|-----------------|-------------------|
| 1.   | x2              | x0              |                   |
| 2.   | x3              | x1              |                   |
| 3.   | x6              | x4              |                   |
| 4.   | x7              | x5              |                   |
| 5.   | xA              | x8              |                   |
| 6.   | xB              | x9              |                   |
| 7.   | xE              | xC              |                   |
| 8.   | xF              | xD              |                   |
| .    | .               | .               |                   |
| .    | .               | .               |                   |

Table 1b

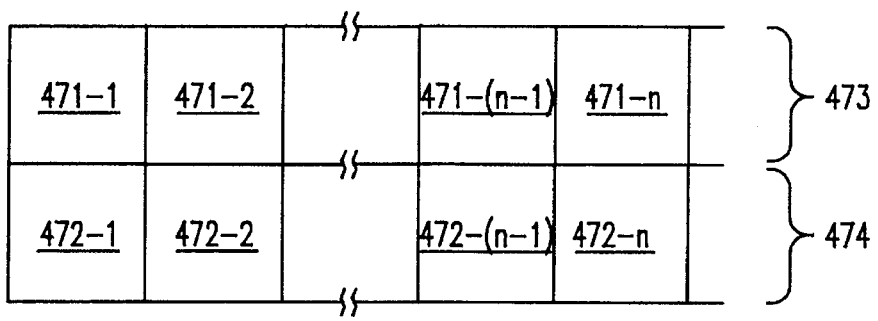

STRUCTURE AND METHOD FOR A MULTISTANDARD VIDEO ENCODER

This application is a division of application Ser. No. 08/389,661, filed Feb. 16, 1995.

BACKGROUND OF THE INVENTION

1. Field of the Invention

The present invention relates to integrated circuit designs; and, in particular, the present invention relates to integrated circuit designs for image processing.

2. Discussion of the Related Art

The Motion Picture Experts Group (MPEG) is an international committee charged with providing a standard for achieving compatibility between image compression and decompression equipment. Since its inception, two standards (referred hereinbelow as "MPEG-1" and "MPEG-2") have been proposed by MPEG. Each of these standards specifies both the coded digital representation of video signal for the storage media, and the method for decoding. The coded digital representation supports normal speed playback, as well as other playback modes of color motion pictures, and reproduction of still pictures. Both the MPEG-1 and MPEG-2 standards cover the common 525- and 625-line television, personal computer and workstation display formats. The MPEG-1 and MPEG-2 standards are intended for equipment supporting high continuous transfer rates, such as those used in compact disks, digital audio tapes, real-time television broadcast, or magnetic hard disks. The MPEG-1 and MPEG-2 standards are intended to support variable-size picture frames of at a rate between 24 Hz and 30 Hz. A publication by MPEG entitled "Coding for Moving Pictures and Associated Audio for digital storage medium at 1.5 Mbit/s" provides in draft form the proposed MPEG-1 standard, which is hereby incorporated by reference in its entirety to provide detailed information about the MPEG-1 standard. A publication by MPEG entitled "Generic Coding of Moving Pictures and Associated Audio Information: Video" provides in draft form the proposed MPEG-2 standard, which is hereby incorporated by reference in its entirety to provide detailed information about the MPEG-2 standard.

Under either the MPEG-1 or the MPEG-2 standard, a picture is divided into a matrix of "Macroblock slices" (MBS), each MBS containing a number of picture areas (called "macroblocks"). Each picture area covers an area of 16×16 pixels and is further represented by one or more 8×8 matrices whose elements are the spatial luminance and chrominance values. In one representation (4:2:2) of the macroblock, the 16×16 pixel area is represented by a 16×16 matrix of luminance values (Y type) and two 8×8 matrices of each of two chrominance values (U and V types, representing respectively blue and red chrominance). That is, the U or V matrices are each provided at one half the resolution of the luminance values. In another representation (4:2:0), 16×16 luminance values in four 8×8 matrices are provided for the 16×16 pixels picture area, and two 8×8 matrices, one for each of the U and V pixel types, are provided to represent the chrominance values of the 16×16-pixel picture area.

In the discussion below, a group of four contiguous pixels in a 2×2 configuration is called a "quad pixel"; hence, the macroblock can also be thought of as comprising 64 quad pixels in an 8×8 configuration. Four quad pels in a 2×2 configuration form a "tile".

The MPEG-1 and MPEG-2 standards both adopt video data compression and decompression models based on lossy compression of both interframe and intraframe information. To compress interframe information, each frame is encoded in one of the following formats: "intra", "predicted", or "interpolated". "Intra-coded" frames ("intra frames" or "I-pictures") are least frequently provided in the compressed data, the predicted frames ("P-pictures") are provided more frequently than the intra frames, and all the remaining frames are interpolated frames. In a P-picture, only the incremental changes in pixel values from the last I-picture or P-picture are coded. In an interpolation frame ("B-picture"), the pixel values are encoded with respect to both an earlier frame and a later frame. By encoding frames incrementally, using predicted and interpolated frames, redundant information between frames can be eliminated, resulting in a highly efficient data storage scheme. Under either MPEG-1 or MPEG-2, the motion of an object moving from one screen position to another screen position can be represented by motion vectors. A motion vector is a "shorthand" representation for encoding a spatial translation of a group of pixels, typically a macroblock.

The next steps in compression under either the MPEG-1 or the MPEG-2 standard provide lossy compression of intraframe information. In the first step, a 2-dimensional discrete cosine transform (DCT) is performed on each of the 8×8 pixel matrices to map the spatial luminance or chrominance values into the frequency domain.

Next, a process called "quantization" weights each element of the 8×8 transformed matrix, consisting of 1 "DC" value and sixty-three "AC" values, according to whether the pixel matrix is of the chrominance or the luminance type, and the frequency represented by each element of the transformed matrix. In an I-picture, the quantization weights are intended to reduce to zero many high frequency components of the image to which the human eye is not sensitive. In P-pictures and B-pictures, which contain mostly higher frequency components, the weights are not related to visual perception. Having created many zero elements in the 8×8 transformed matrices, each matrix can be represented without further information loss as an ordered list consisting of a "DC" value, and alternating pairs of a non-zero "AC" value and a length of zero elements following the non-zero value. Under MPEG-2, the ordered list can be prepared from one of two prescribed orders of listing the matrix elements.

Finally, an entropy encoding scheme using variable-length codes is used to further compress the representations of the DC coefficient and the AC value-run length pairs. Under the entropy encoding scheme, the more frequently occurring symbols are represented by shorter codes. Further efficiency in storage is thereby achieved.

The MPEG-1 and MPEG-2 standards differ in many respects, some of which are discussed next. First, under the MPEG-1 standard, an interlaced video sequence is encoded using the entire frame, consisting of both odd and even fields. Under MPEG-2, however, any field of a frame in a video sequence can be predicted using either a selected field or a selected frame.

Second, under the MPEG-1 standard, each DCT coefficient of a 8×8 luminance or chrominance matrix is coerced ("oddified") to an odd value. Under the MPEG-2 standard, however, if the cyclic redundancy checksum (CRC) of the entire 8×8 luminance or chrominance matrix is even, then the last DCT coefficient is oddified. Under the MPEG-1 standard, each DCT coefficient is represented by an 8-bit value. Under the MPEG-2 standard, each DCT coefficient can be represented by an 11-bit value.

The steps involved in compression under either MPEG-1 and MPEG-2 standards are computationally intensive. For such a compression scheme to be practical and widely accepted, however, a high-speed processor at an economical cost is desired. Such processor is preferably provided in an integrated circuit.

Thus, it would be desirable to provide a multistandard video encoder which can be selectably used for encoding a video sequence under either the MPEG-1 or the MPEG-2 standards. In particular, it would be beneficial to provide in such a multistandard encoder both hardware and software supports to achieve efficiency in implementing the extensions in MPEG-2 of MPEG-1 features.

SUMMARY OF THE INVENTION

The present invention provides an encoder or decoder for image processing under both MPEG-1 and MPEG-2 by providing at least the features of (i) selective retrieval of image data by frame or by one of the two fields of a frame; (ii) an automatic two-dimensional fetch of a reference picture area, which is provided on multiple pages of DRAM memory without firmware intervention; and (iii) a dedicated circuit in the central processing unit for dequantization of discrete cosine transform (DCT) coefficients which can be used under both the MPEG-1 and the MPEG-2 standards. The present invention also provides the methods used in such an encoder or decoder.

In a video signal processing system of the present invention, a video image can be stored in one or more frames of pixel data, where each frame includes two component fields of pixel data. Such a video signal processing system comprises (i) an address bus including a first memory address and an additional address bit; (ii) a data bus including a first portion and a second portion; (iii) a memory system, and (iv) a memory controller for generating the address and the additional bit. The memory system of the present invention is organized to include a first bank of storage locations and a second bank of storage locations. Upon receiving the first memory address and the additional bit, the first bank of storage locations is accessed by the first memory address to provide data output on the first portion of the data bus, and the second bank of storage locations is accessed by a second memory address formed by replacing a corresponding bit in the first memory address by the additional bit. The second bank of storage locations provides data output on the second portion of the data bus.

In one embodiment of the present invention, the video signal processing generates the corresponding bit and the additional bit to be unequal when retrieving video data from the same field.

The present invention can also be implemented in an integrated circuit for video signal processing. Such an integrated circuit has (i) an interface to the address bus which is adapted to carry a memory address and an additional bit, (ii) an interface to a data bus having a first portion and a second portion; and (iii) a memory controller for generating the memory address and the additional bit.

In accordance with another aspect of the present invention, a circuit and a method for fetching, from an external memory, a two-dimensional reference picture area are provided. In such an external memory, video data are stored in units of macroblocks, such that adjacent macroblocks in a row of macroblocks of an image are accessible from memory locations within the same memory page. The circuit for the fetching the two-dimensional reference picture area includes (i) a counter for storing a count value representative, initially, of the location, in image space, of a pixel of the two-dimensional reference picture area relative to a predetermined location, in image space, of a macroblock to which said pixel belongs; (ii) an address register for holding an initial memory address corresponding to a memory location holding said pixel; (iii) a memory controller, in accordance with the count value, for generating a predetermined sequence of memory addresses to access a portion of the two-dimensional reference picture area within a memory page including the initial memory address; and (iv) a circuit for detecting completion of access to said portion of said two-dimensional reference picture area and for loading a new count value in the counter and a new initial memory address in the address register, while there remains pixels in said 2-dimensional reference picture area not in the memory page and not previously fetched. In the present invention, the counter is updated as pixels of the macroblocks are fetched.

Thus, the present invention provides an automatic method for fetching the entire 2-dimensional reference picture area automatically without firmware interruption and crosses the least number of DRAM boundaries to exploit the speed advantage of the page mode access in DRAMs.

In one embodiment, the luma reference area is fetched using a sequence in which the DMA channel memory entry is reloaded once in a majority of cases (i.e. crossing a single DRAM boundary), and reloaded three times in a special case circuit (i.e. crossing two DRAM boundaries).

In one embodiment, the count in the counter of the present configuration comprises a plurality of subfields, such that said subfields, as updated by said counter, are indicative of the locations, in image space, of the pixels fetched.

In accordance to another aspect of the present invention, a central processing unit in a video signal processing integrated circuit and its associated method are provided. This integrated circuit is particularly adapted to perform, in a single instruction, the step of dequantizing elements of a matrix of discrete cosine transform (DCT) coefficients. In accordance with the present invention, the central processing unit includes: (i) a multiplier adapted for computing, for each DCT coefficient of the matrix of DCT coefficients, the product of the DCT coefficient, an element of a dequantization matrix corresponding to the DCT coefficient, and a scaling factor from a dequantization scaling matrix corresponding to the DCT coefficient; (ii) an oddification circuit, receiving the product from the multiplier, for providing an oddified value obtained by oddifying the product when the product is even; and (iii) a selector circuit, receiving the product from the multiplier and the oddified product from the oddification circuit, for selecting, in accordance with a predetermined video processing standard, whether the product from the multiplier or the oddified product is provided as an output value of the central processing unit.

The selector circuit in the central processing unit of the present invention, thus, can be used to bypass the oddification circuit. In one embodiment, instead of performing an oddification in the dequantization of each DCT coefficient, a running checksum is kept, such that oddification is performed by firmware only at the last dequantized DCT coefficient of a 8×8 macroblock, as prescribed by the MPEG-2 standard. The central processing unit of the present invention can thus be used under both the MPEG-1 and the MPEG-2 standards.

The present invention is better understood upon consideration of the detailed description below and the accompanying drawings.

BRIEF DESCRIPTION OF THE DRAWINGS AND THE TABLES

FIG. 1a is a block diagram of an embodiment of the present invention provided in an MPEG encoder chip 100.

FIG. 1b shows a multi-chip configuration in which two copies of chip 100, chips 100a and 100b, are used.

FIG. 3e shows a bit assignment diagram for the channel memory entry of channel 6.

FIG. 3f(i) and (ii) show tiles (i.e. groups of four quad pels) 350 and 351 stored in "video capture" and "reference" orders, respectively.

Figure 4A:
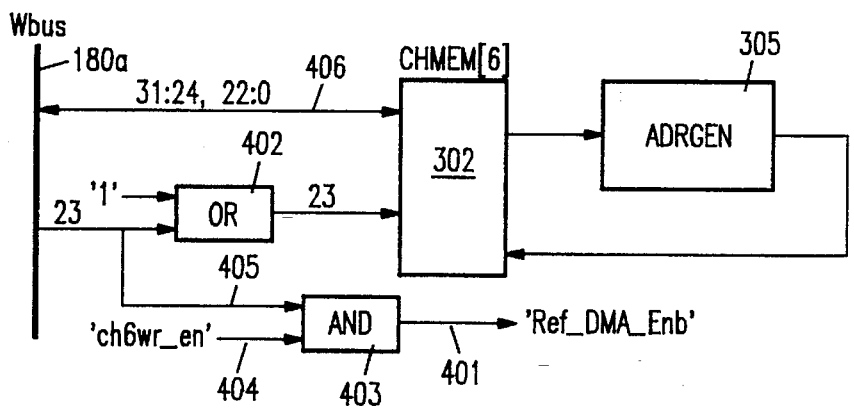

FIG. 4a shows a circuit for setting to '1' bit 23 of the channel memory entry for channel 6 and for generating a control signal to indicate reference order access.

Figure 4B:
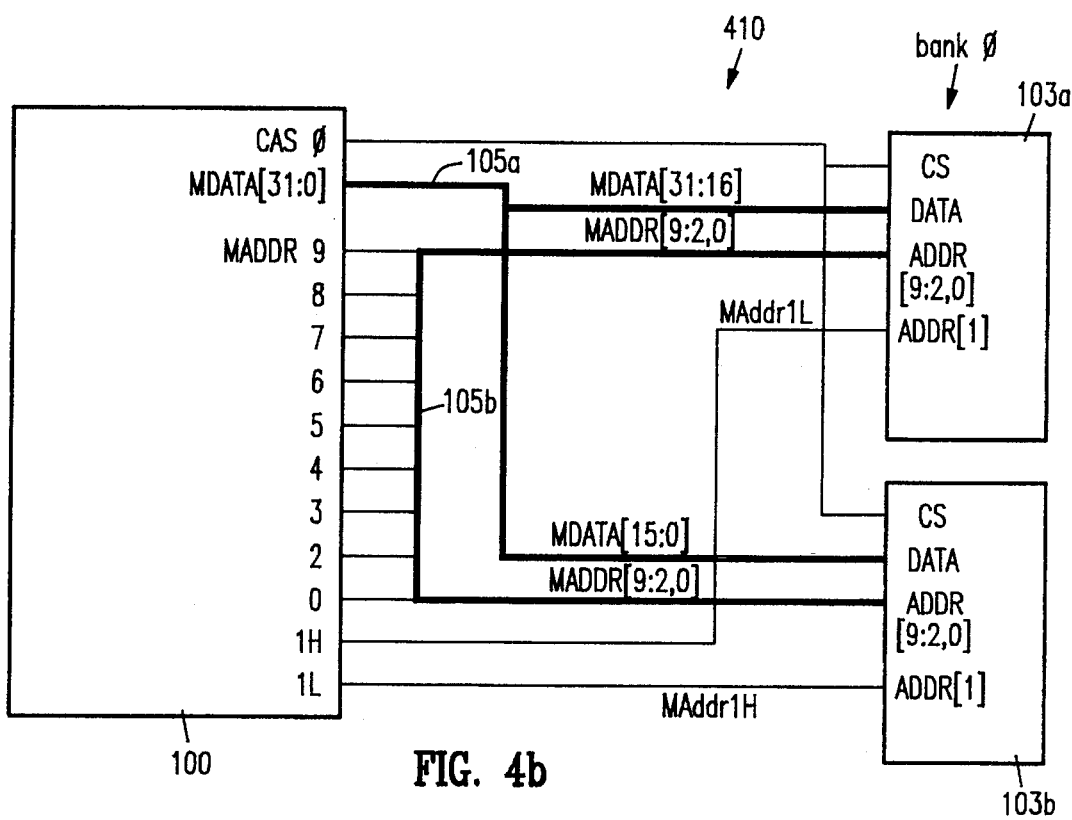

FIG. 4b shows a configuration 410 of chip 100 and external memory 103 which allows independent addressing of the upper and lower half words of a 32-bit wide external memory 103.

Figure 4C:
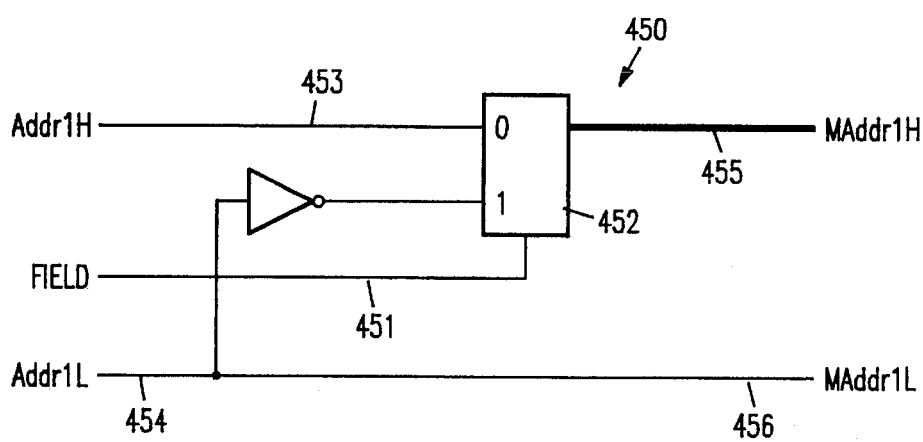

FIG. 4c shows a circuit 450 for generating the values of MAddr1H and MAddr1L during a field DMA transfer.

Figure 4D:
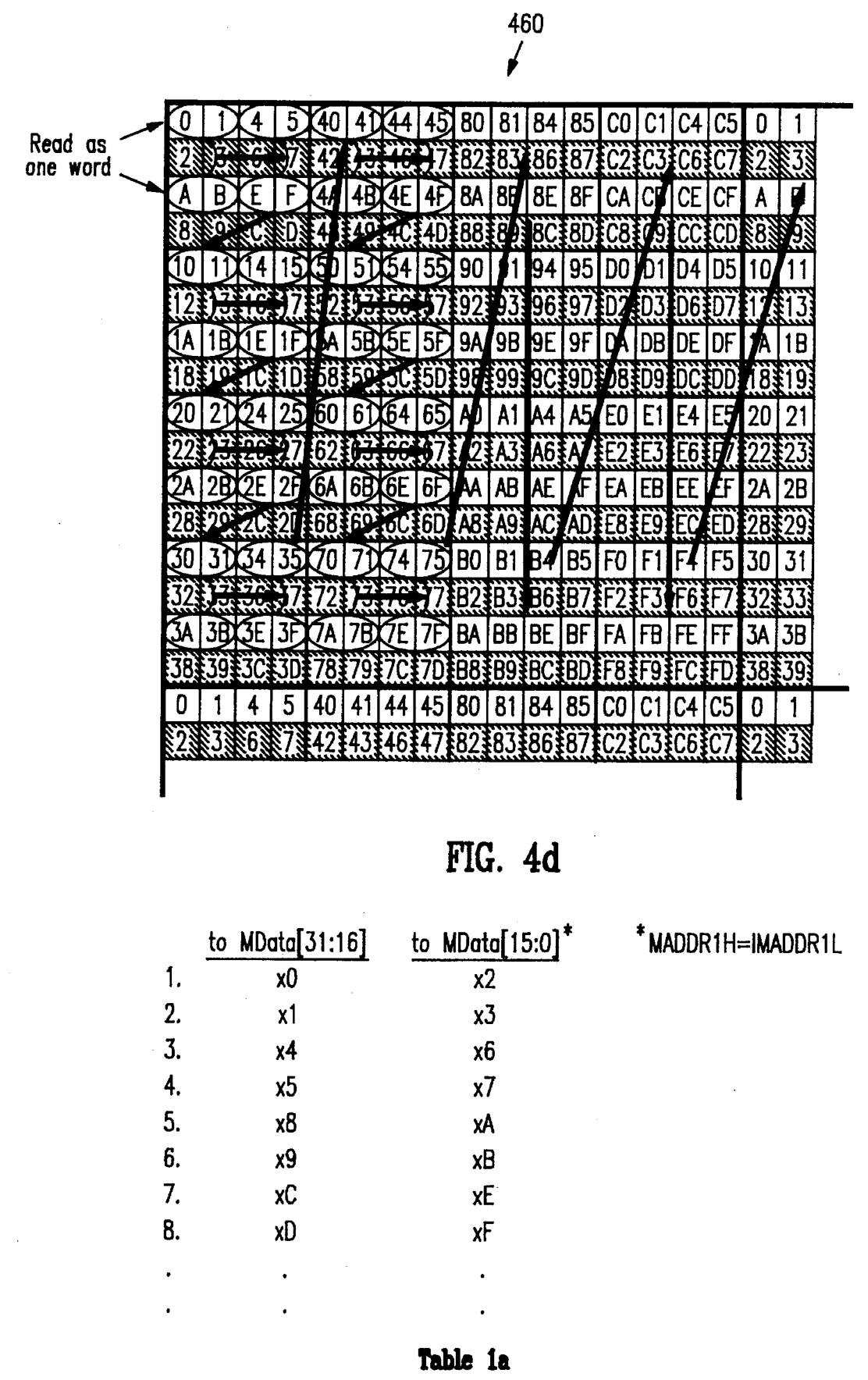

FIG. 4d shows the access pattern under a field DMA transfer for accessing, in a macroblock 460, pixels belonging to an even field.

Figure 4E:
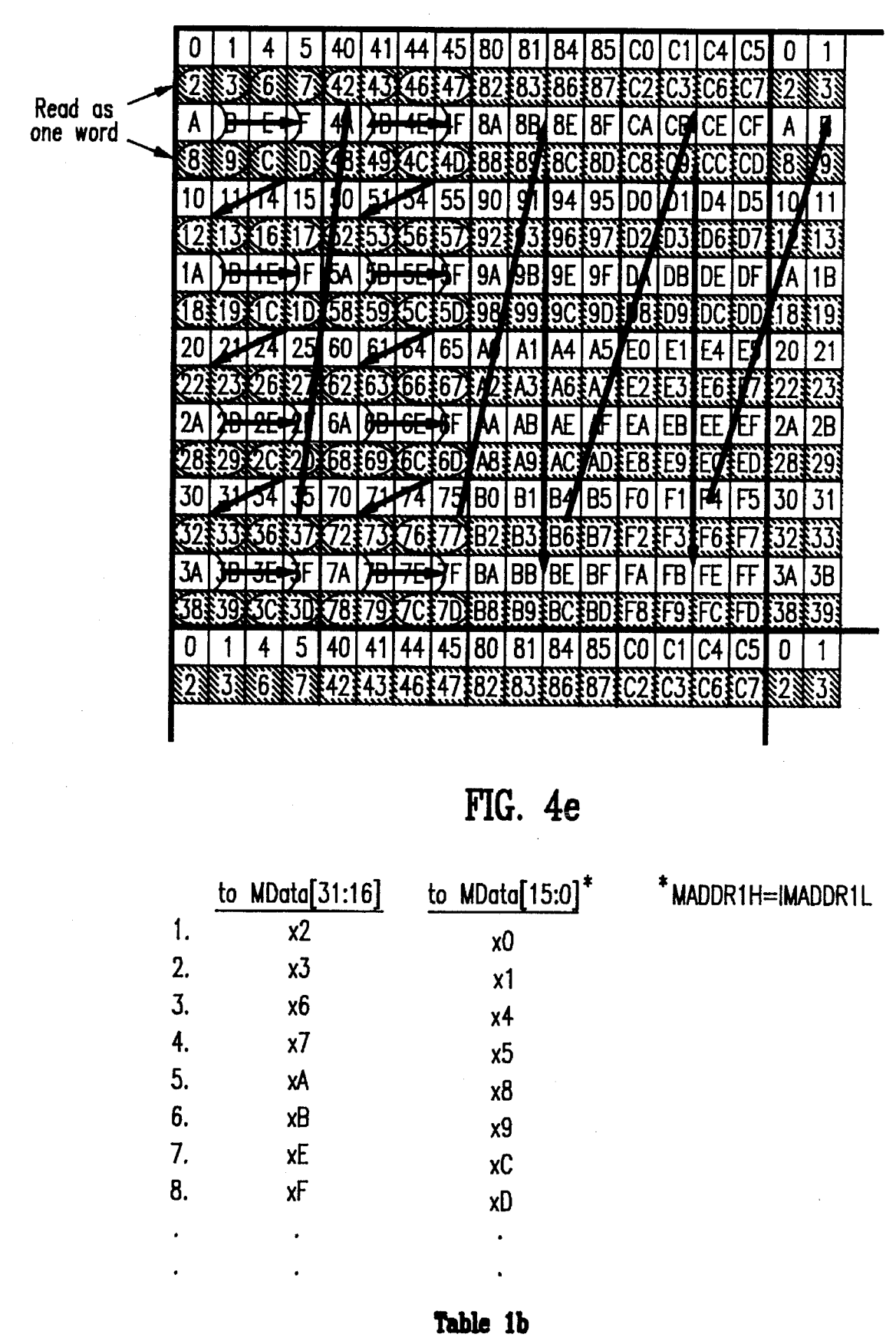

FIG. 4e shows the access pattern under a field DMA transfer for accessing, in a macroblock 460, pixels belonging to an odd field.

FIG. 4f shows, in an embodiment of the present invention, horizontal rows of macroblocks in a frame, where each horizontal row of macroblocks is stored in a DRAM page.

FIG. 4g shows a labelling scheme for identifying tiles (i.e. 4×4 pixels) of "U" type chroma pixels on an image.

FIG. 4h shows the mapping of the 4×4 "U" type and "V" chroma pixels to the external DRAM memory.

Figure 5A:
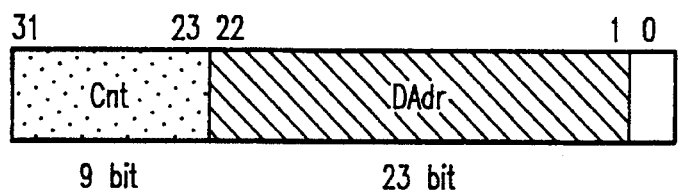

FIG. 5a shows the bit assignments for a DMA channel entry for fetching a reference picture area for motion estimation operations.

Figure 5B:
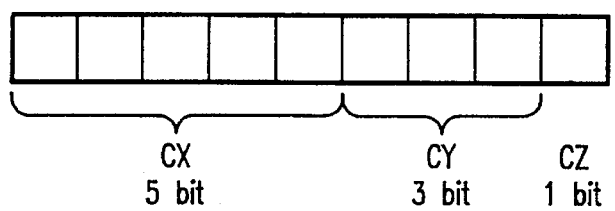

FIG. 5b shows the three subfields CX, CY and CZ in the DMA channel entry of FIG. 5a for a luma reference fetch.

Figure 5C:
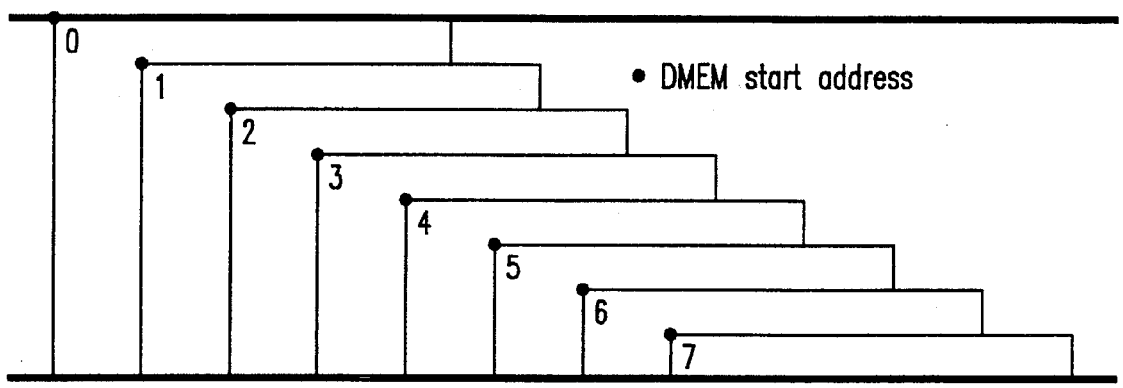

FIG. 5c shows the various possible values of the CY subfield in the DMA channel entry of FIG. 5a for a luma reference fetch.

Figure 5D:
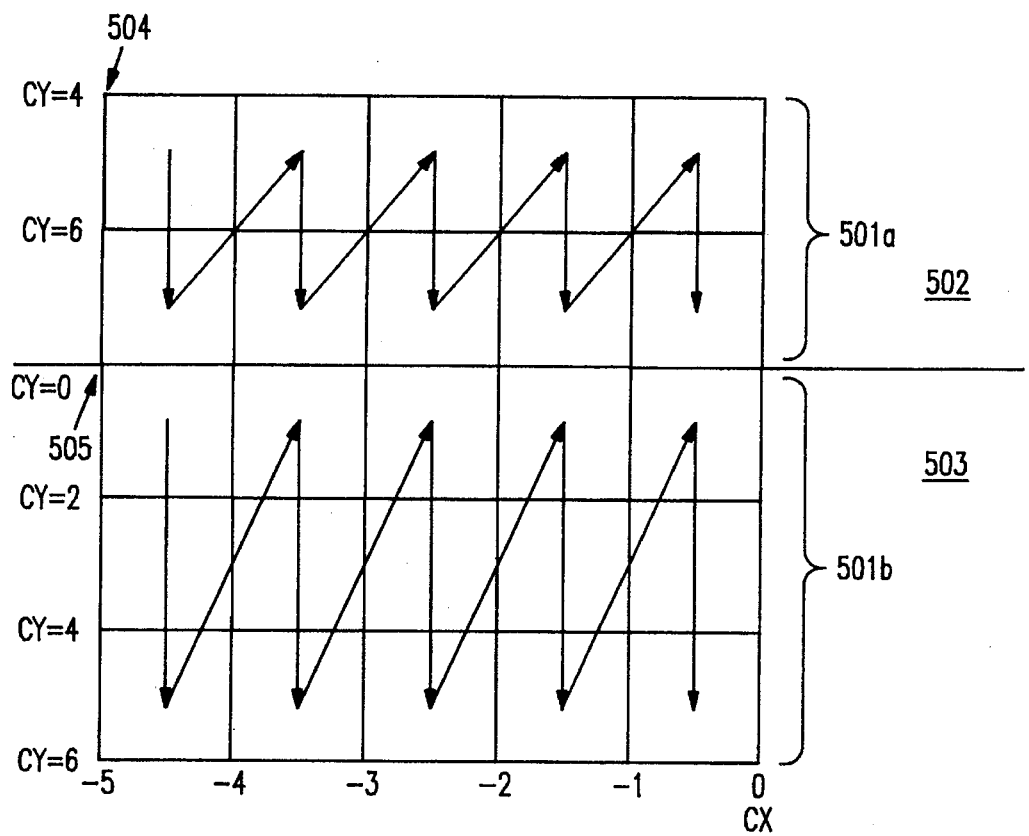

FIG. 5d illustrates the "general case" for fetching a 20×20 luma reference picture area 501; under the general case, two DRAM pages 502 and 503 are accessed.

Figure 5E:
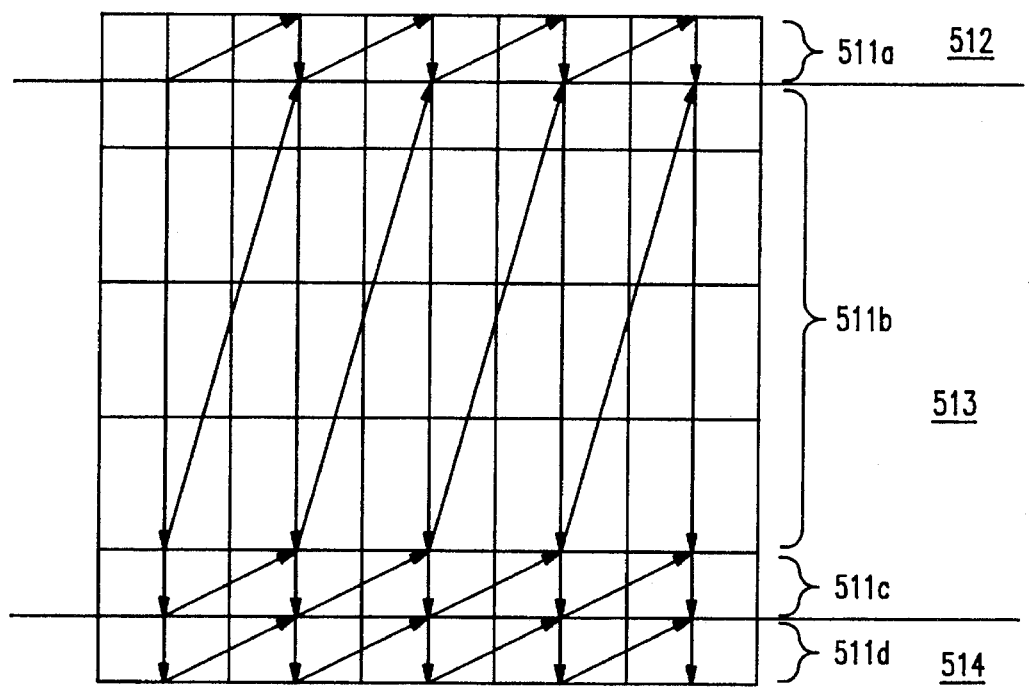

FIG. 5e illustrates the "special case" for fetching a 20×20 luma reference picture area 511; under the special case, three DRAM pages 512, 513 and 514 are accessed.

Figure 5F:
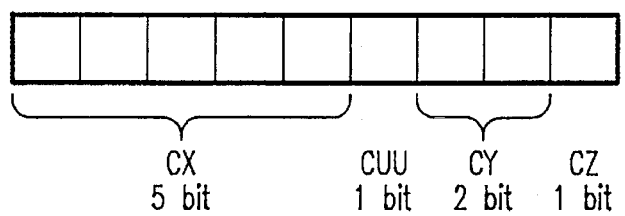

FIG. 5f shows the counter field in the DMA channel memory entry of FIG. 5a for fetching a chroma reference picture area.

Figures 1, 5G:
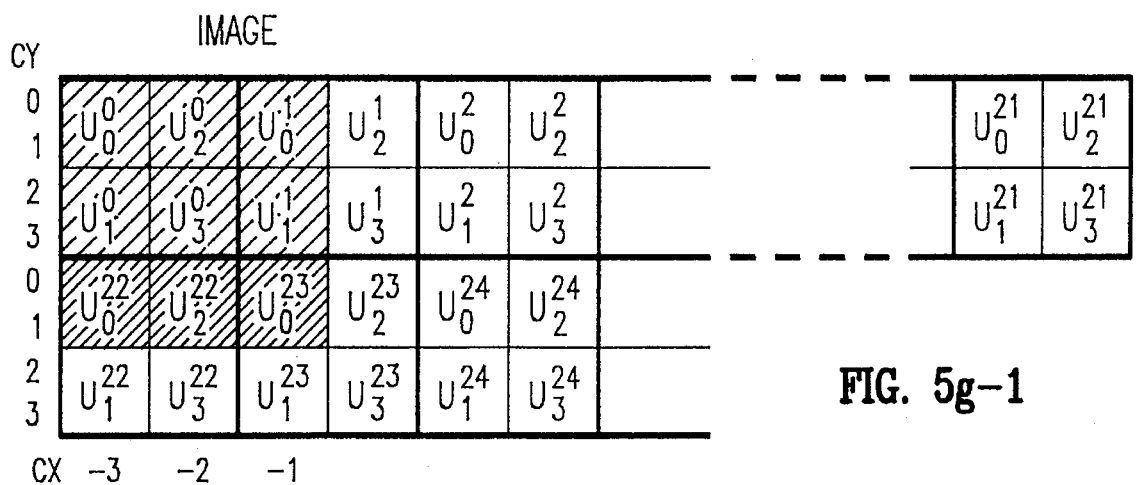

FIG. 5g-1 shows, with respect to a macroblock boundary, the position in image space of a chroma reference picture area under the first of four cases.

Figures 2, 5G:
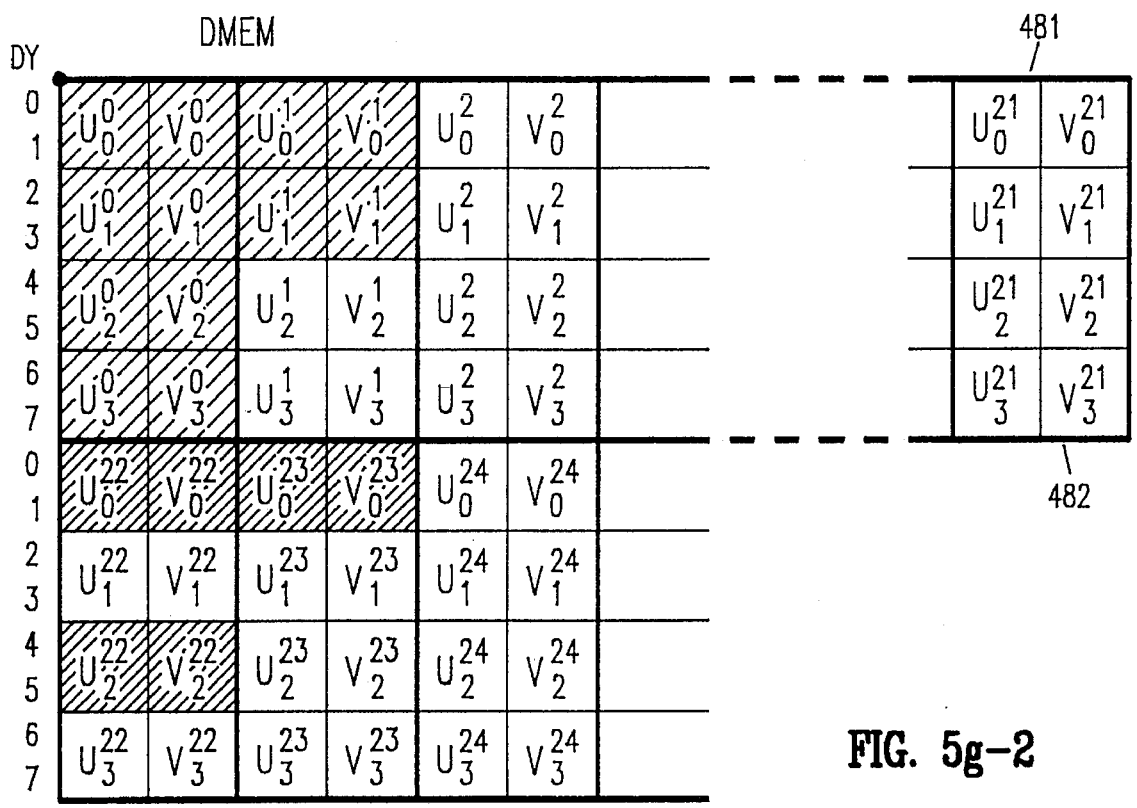
FIG. 2 is an overview of data flow between memory blocks relating to CPU 150.

FIG. 5g-2 shows, in DRAM memory, the location storing the pixels of the chroma reference picture area of FIG. 5g-1.

Figures 5H-1, 5H-2:
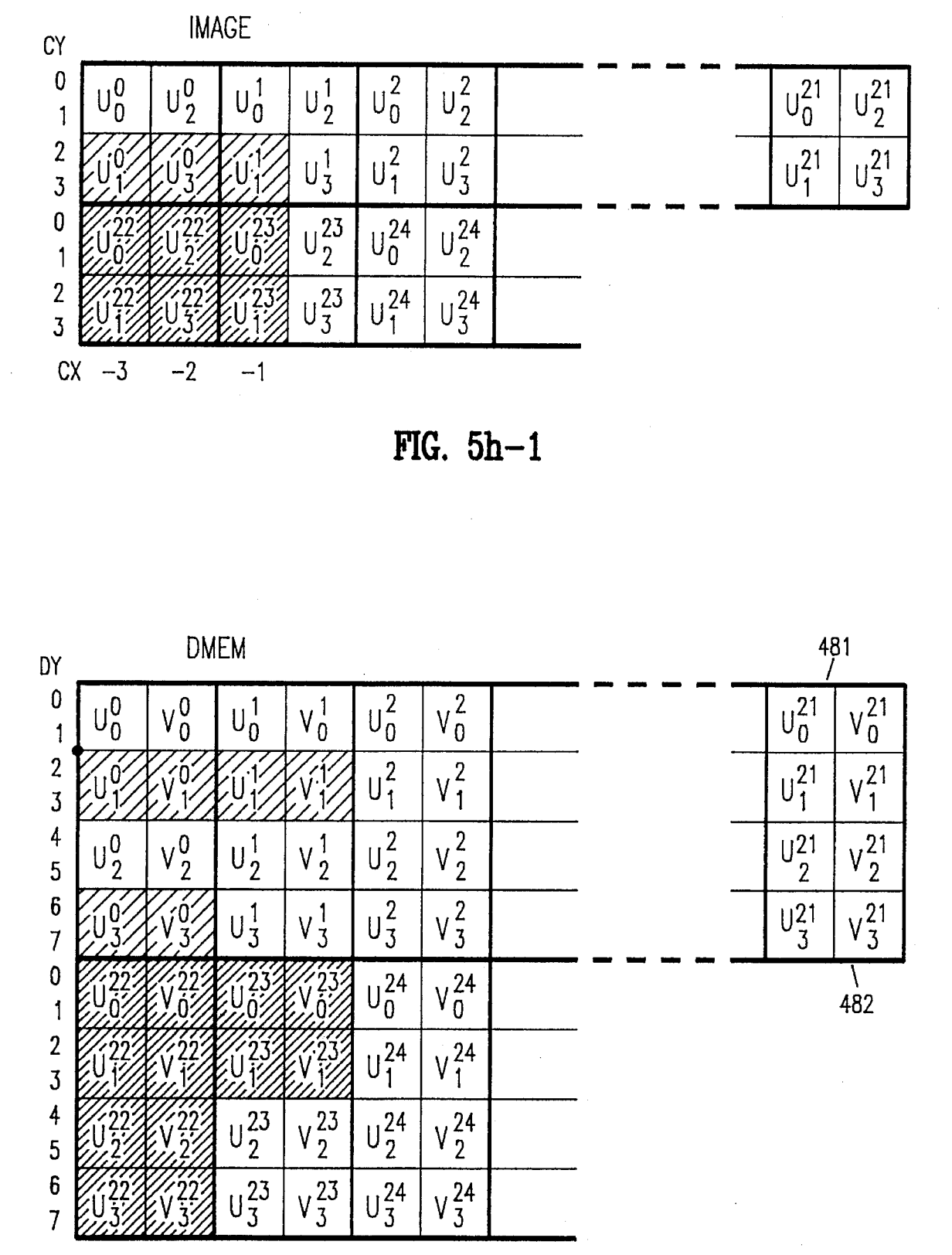

FIG. 5h-1 shows, with respect to a macroblock boundary, the position in image space of a chroma reference picture area under the second of four cases.

FIG. 5h-2 shows, in DRAM memory, the location storing the pixels of the chroma reference picture area of FIG. 5h-1.

Figures 5I-1, 5I-2:
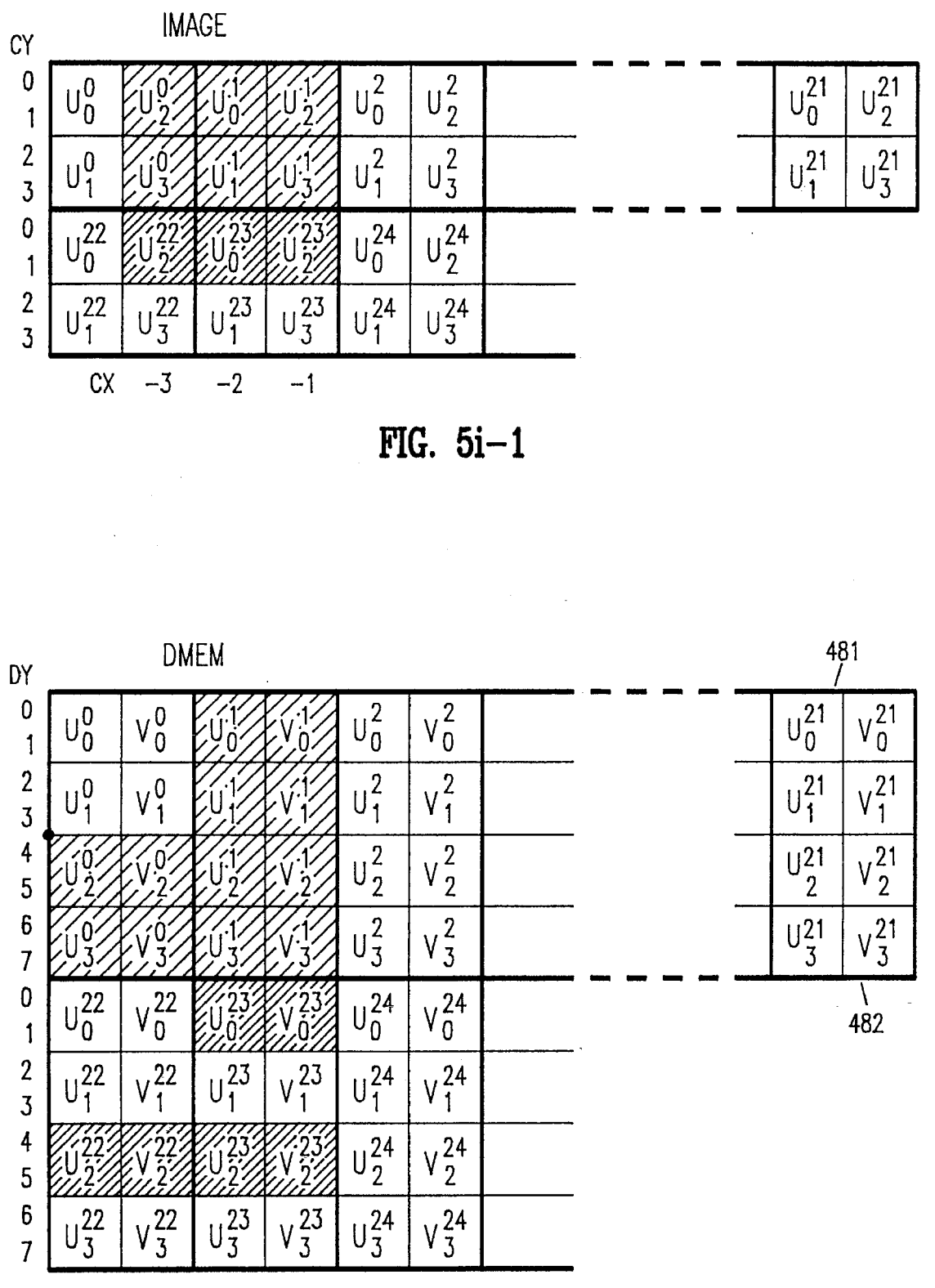

FIG. 5i-1 shows, with respect to a macroblock boundary, the position in image space of a chroma reference picture area under the third of four cases.

FIG. 5i-2 shows, in DRAM memory, the location storing the pixels of the chroma reference picture area of FIG. 5i-1.

Figures 5J-1, 5J-2:
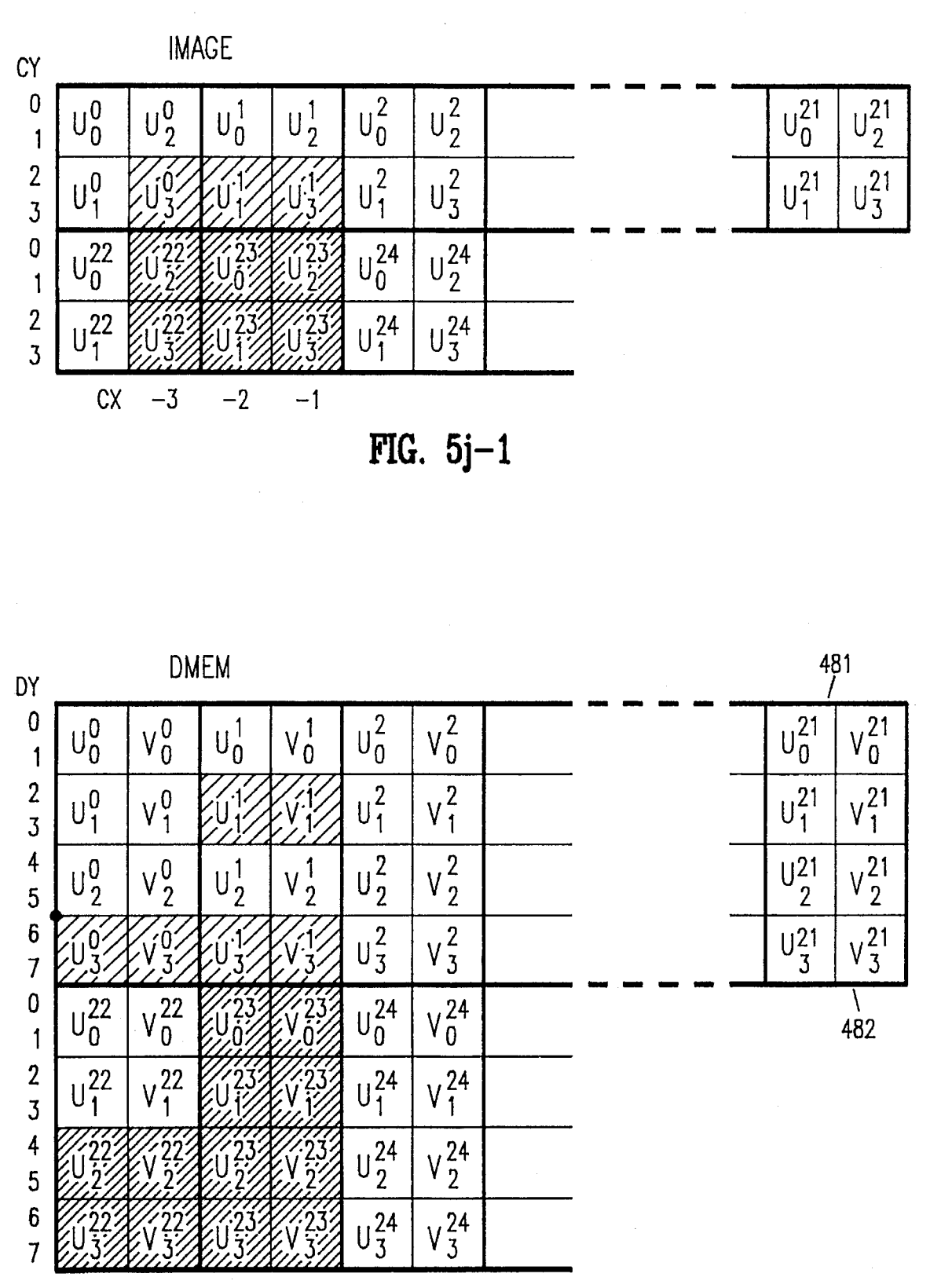

FIG. 5j-1 shows, with respect to a macroblock boundary, the position in image space of a chroma reference picture area under the fourth of four cases.

FIG. 5j-2 shows, in DRAM memory, the location storing the pixels of the chroma reference picture area of FIG. 5j-1.

Figure 5K:
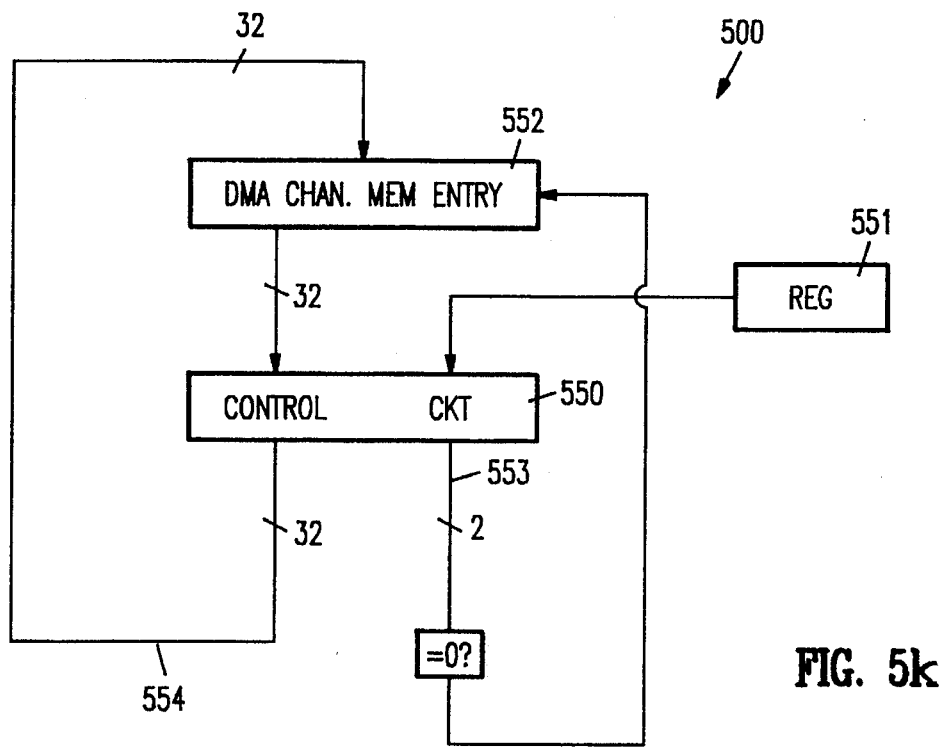

FIG. 5k shows a block diagram of the reference fetch control hardware 500 for automatically reloading the DMA channel memory entry for channel 6 (SMEM 159).

Figure 6A:
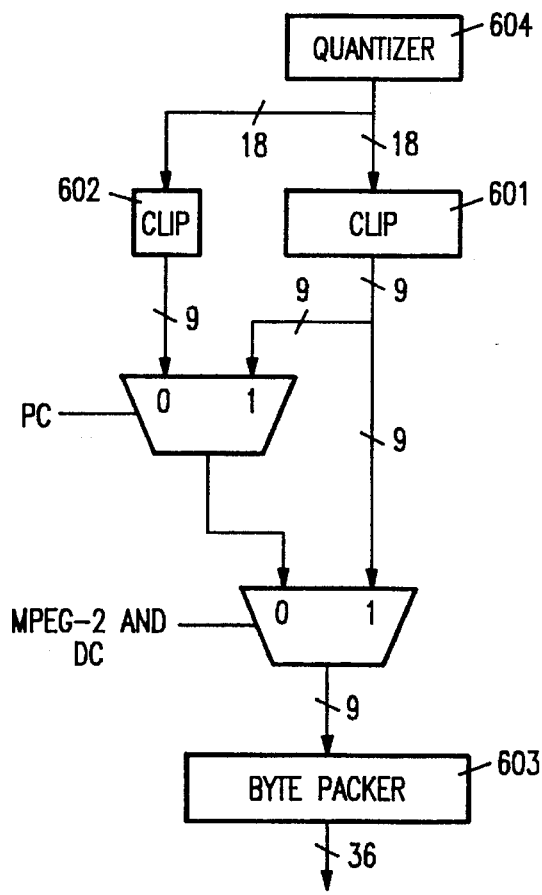

FIG. 6a shows a circuit which allows the clipping of a DC DCT coefficient to be bypassed under the MPEG-2 standard.

Figures 6B, 6C, 6D:
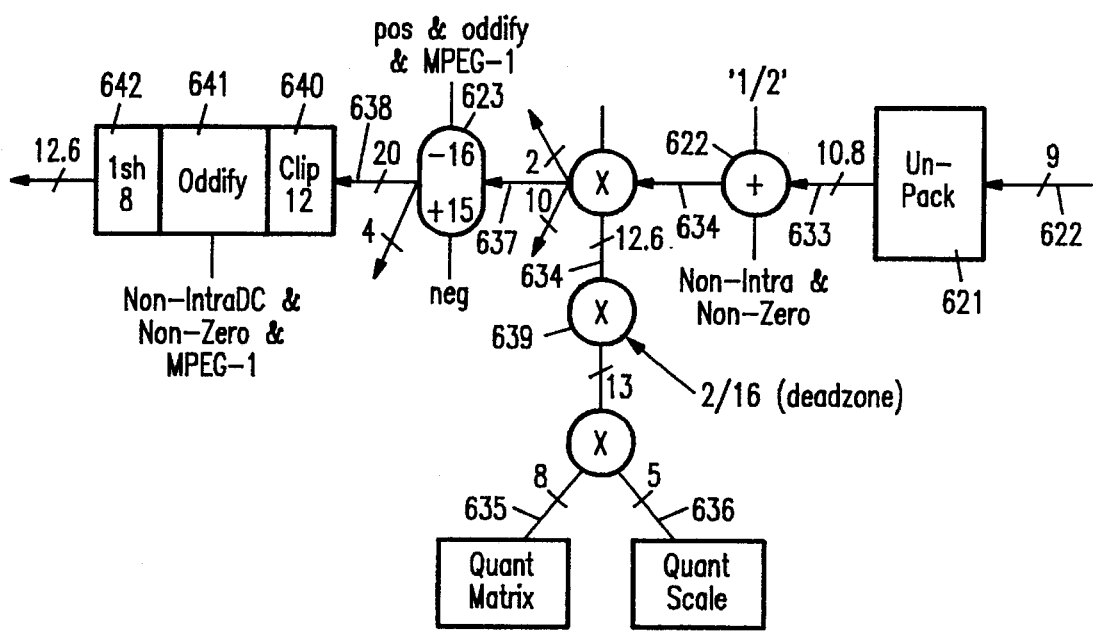

FIG. 6b shows the packing of an 18-bit DC coefficient and an 18-bit AC coefficient in a 36-bit word.

FIG. 6c shows the packing of a 9-bit DC coefficient and three 9-bit AC coefficients.

FIG. 6d shows the data flow of the DMUL instruction in CPU 150.

Table 1a provides, as offset from the starting address of macroblock 460, the word address offsets for the upper and lower halfwords in the field DMA transfer of FIG. 4d (even field).

Table 1b provides, as offset from the starting address of macroblock 460, the word address offsets for the upper and lower halfwords in the field DMA transfer of FIG. 4e (odd field).

DETAILED DESCRIPTION OF THE PREFERRED EMBODIMENTS

The present invention extends the capability of an existing design of an MPEG-1 multistandard video encoder/decoder, such as the video encoder/decoder integrated circuit described in the copending patent application ("Copending Application") entitled "Structure and Method for a Multistandard Encoder/Decoder", by S. Purcell et al, Ser. No. 08/105,253, filed Aug. 9, 1993, assigned to C-Cube Microsystem, Inc., which is also the Assignee of the present application. Thus, the present invention can be implemented as a modification of the MPEG-1 encoder/decoder in the encoder/decoder structure of the Copending Application. The Copending Application is hereby incorporated by reference in its entirety.

Figure 1A:
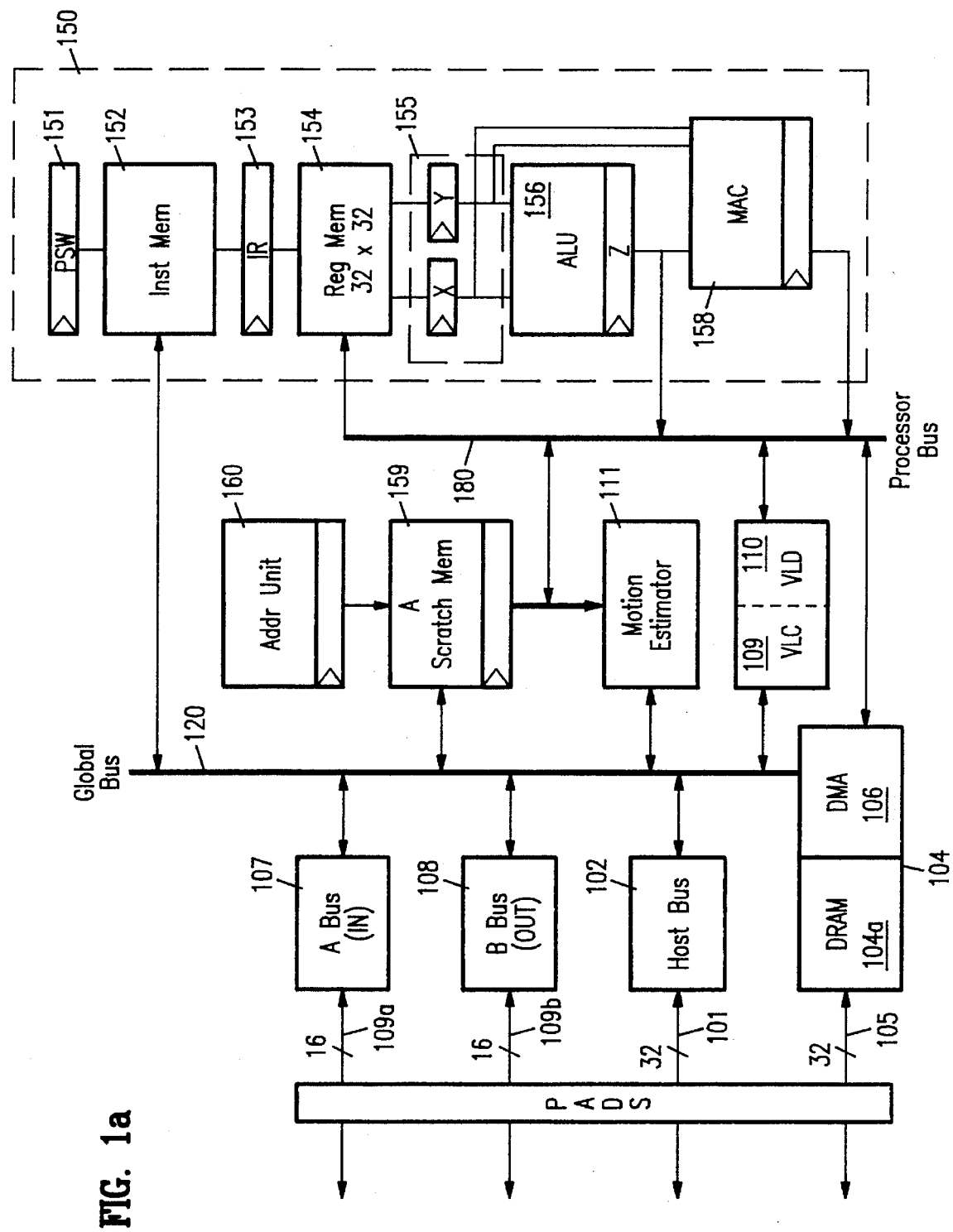
FIG. 1c is a map of chip 100's address space.

FIG. 1a is a block diagram of an embodiment of the present invention provided in an encoder integrated circuit 100 ("chip 100"). In this embodiment, chip 100 encodes a video bit stream into a compressed format compatible with MPEG-1, MPEG-2, JPEG and CCITT H.261 (or "P×64") standards, and provides the corresponding decoding in playback operation.

As shown in FIG. 1a, chip 100 communicates through host bus interface 102 with a host computer (not shown) over 32-bit host bus 101. Host bus interface 102 implements the IEEE 1196 NuBus standard. In addition, chip 100 communicates with an external memory 103 (not shown) over 32-bit memory bus 105. Chip 100's access to external memory 103 is controlled by a memory controller 104, which includes dynamic random access memory (DRAM) controller 104a and direct memory access (DMA) controller 106. Chip 100 has two independent 16-bit bidirectional video ports 107 and 108 receiving and sending data on video busses 190a and 190b respectively. Video ports 107 and 108 are substantially identical, except that port 107 is provided with a decimation filter, and port 108 is provided with an interpolator.

The functional units of chip 100 communicate over an internal global bus 120. Such functional units include the central processing unit (CPU) 150, the variable-length code coder (VLC) 109, variable-length decoder (VLD) 110, and motion estimator 111. Central processing unit 150 includes the processor status word register 151, which stores the state of CPU 150, instruction memory ("I mem") 152, instruction register 153, register file ("RMEM") 154, which includes 31 general purpose registers R1–R31, byte multiplexer 155, arithmetic logic unit ("ALU") 156, memory controller 104, multiplier-accumulator (MAC) 158, and scratch memory ("SMEM") 159, which includes address generation unit 160. Memory controller 104 provides access to external memory 103, including direct memory access (DMA) modes.

Global bus 120 is accessed by SMEM 159, motion estimator 111, VLC 109, VLD 110, memory controller 104, instruction memory 152, host interface 102 and bidirectional video ports 107 and 108. A processor bus 180 is used for data transfer between SMEM 159, VLC 109 and VLD 110, and CPU 150.

During video operations, the host computer initializes chip 100 by loading the configuration registers in the functional units of chip 100, and maintains the bit streams sending to or receiving from video ports 107 and 108.

Figure 1B:
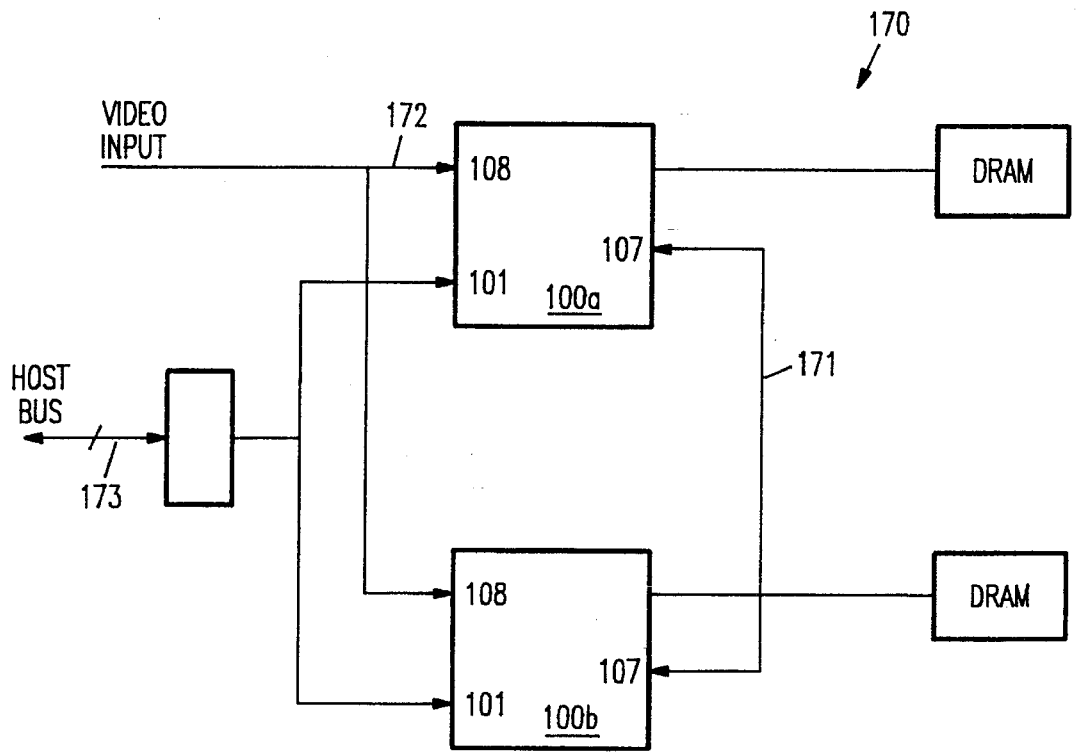
Figure 1C:
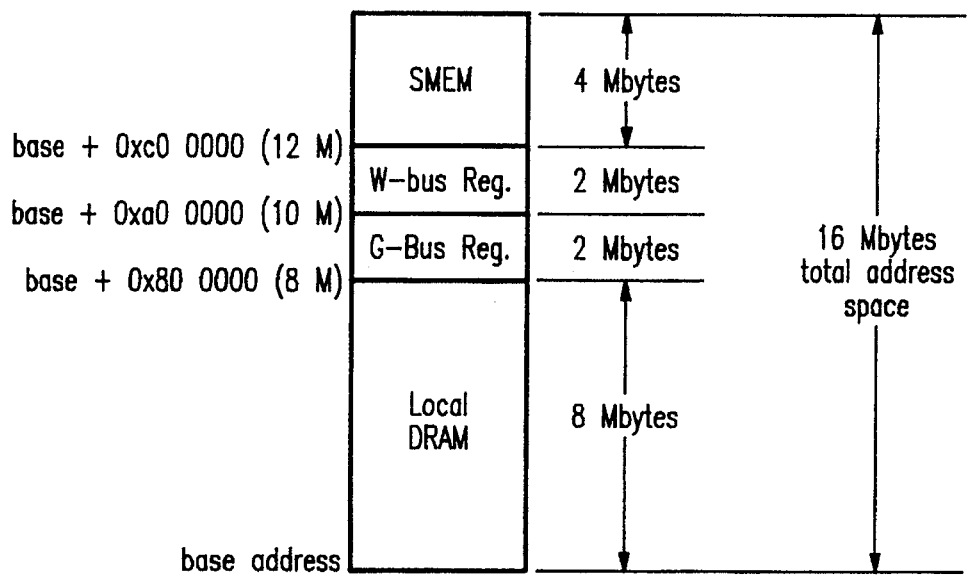

Chip 100 has an memory address space of 16 megabytes. A map of chip 100's address space is provided in FIG. 1c. As shown in FIG. 1c, chip 100 is assigned a base address. The memory space between this base address and the location having the address {base address+7FFFFF[1]} is reserved for an external dynamic random access memory (DRAM). The memory space between location {base address+800000} and location {base address+9FFFFF} is reserved for registers addressable over global bus 120 (G-bus Reg.). The memory space between location {base address+A00000} and location {base address+BFFFFF} is reserved for registers addressable over a processor bus or write-back bus ("W bas") 180a (W-bus Reg.). A scratch or cache memory, i.e. memory 159, is allocated the memory space between location {base address+C00000} and location {base address+FFFFFF} (SMEM).

[1] Addresses in this descriptions are provided in hexadecimal, unless otherwise stated.

A multi-chip system can be built using multiple copies of chip 100. FIG. 1b shows a two-chip configuration 170, in which two copies of chip 100, chips 100a and 100b are provided. In this embodiment, up to 16 copies of chip 100 can be provided in a multi-chip configuration. In such a system, video port 108 of each chip is connected to a reference video bus, such as bus 171, which is provided for passing both video data and non-video data between chips. Each chip receives video input data at port 107. In FIG. 1b, the video input port 107 of each chip receives input data from external video bus 172. Each chip is provided a separate 16-megabyte address space which does not overlap with the address spaces of other chips in the multi-chip configuration.

Internally, chip 100 has six major blocks of memory circuits relating to CPU 150. These memory circuits, which are shown in FIG. 2, include instruction memory 152, register memory 154, Q memory 201 ("QMEM"), SMEM 159, address memory ("AMEM") 206, and P memory 202 ("PMEM"). In addition, a FIFO memory ("VLC FIFO") 203 (not shown) is provided for use by VLC 109 and VLD 110 (FIG. 1a) during the coding and decoding of variable-length codes. A "zig-zag" memory 204 ("Z mem", not shown) is provided for accessing DCT coefficients in either zigzag or binary order. Finally, a window memory 205 ("WMEM", not shown) is provided in motion estimator 111 (FIG. 1a) for storing the current and reference blocks used in motion estimation. The operations of instruction memory 152, register file 154, QMEM 201, SMEM 159, AMEM 206, and PMEM 202 ("PMEM") are discussed in detail in the Copending Application incorporated by reference above.

Figure 3A:
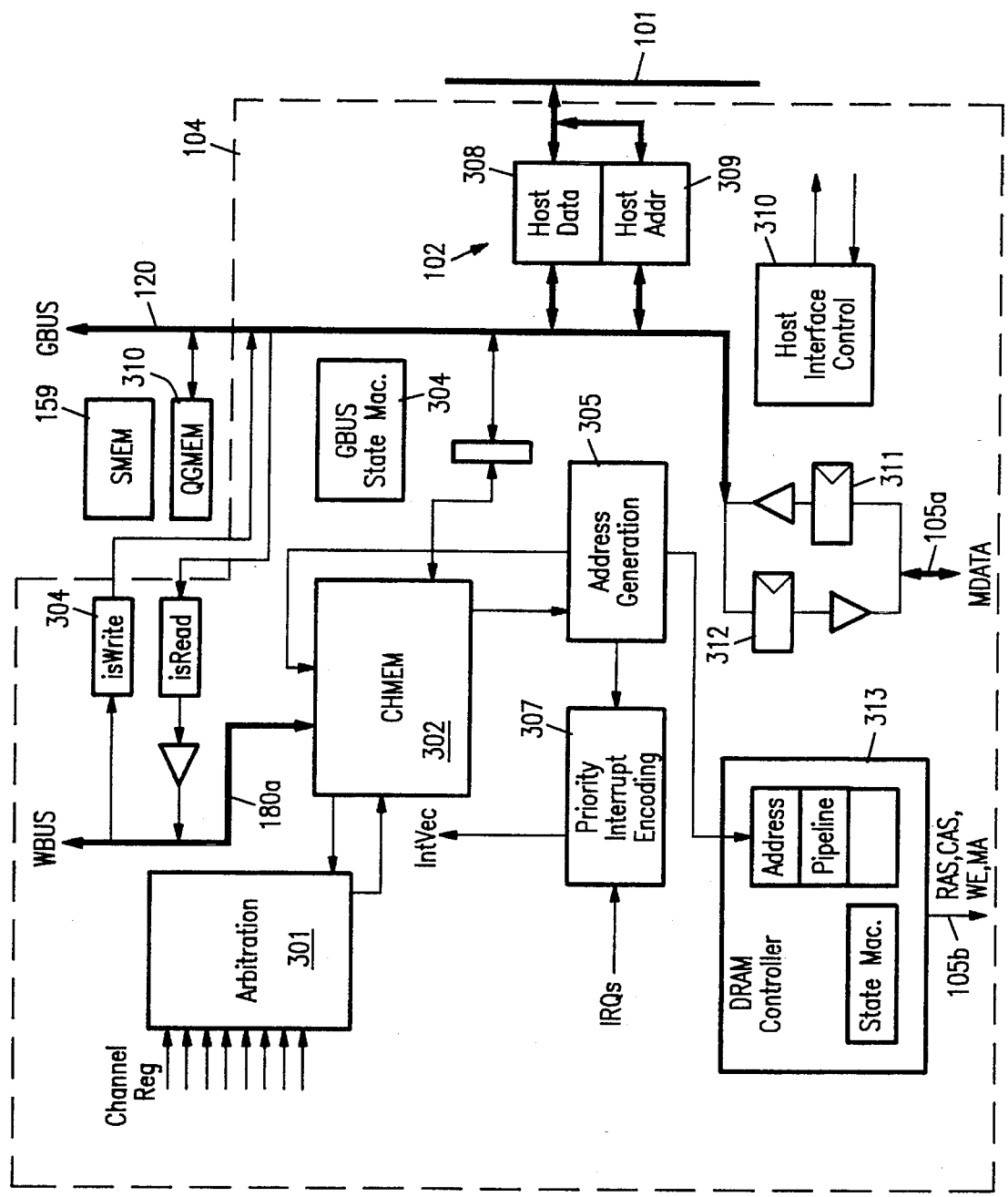
FIG. 3a is a block diagram of memory controller 104, in accordance with the present invention.

Chip 100 accesses external memory 103, which is implemented by dynamic random access memory (DRAM). Controller 104 supports one, two or four banks of memory, and up to a total of eight megabytes of DRAM. Memory controller 104 manages the accesses to both external memory 103 and the internal registers. In addition, memory controller 104 also (a) arbitrates requests for the use of global bus 120 and W bus 180a; (b) controls all transfers between external memory 103 and the functional units of chip 100, and (c) controls transfers between QG registers ("QGMEM") 310 and SMEM 159. FIG. 3a is a block diagram of memory controller 104. QGMEM 310 is a 128-bit register which is used for block transfer between 144-bit SMEM 159 and 32-bit global bus 120. Thus, for each transfer between QGMEM 310 and SMEM 159, four transfers between global bus 120 and QGMEM 310 would take place.

As shown in FIG. 3a, an arbitration circuit 301 receives requests from functional units of chip 100 for data transfer between external memory 103 and the requesting functional units. Data from external memory 103 are received into input buffer 311, which drives the received data onto global bus 120. The requesting functional units receive the requested data either over global bus 120, or over processor bus (i.e. W bus) 180a in the manner described below. Data to be written into external memory 103 are transferred from the functional units over either w bus 180a or global bus 120. Such data are received into a data buffer 312 and driven on to memory data bus 105a.

W bus 180a is formed by a 36-bit data bus 180a-1 and a 6-bit address bus 180a-2. The address and data busses 180a-1 and 180a-2 are pipelined so that the address on address bus 180a-2 is associated with the data on data bus 180a-2 in the next cycle. The most significant bit of address bus 180a-2 indicates whether the operation reads from a register of a functional unit or writes to a register of a functional unit. The remaining bits on address bus 180a-2 identify the source or the destination register.

In memory controller 104, a channel memory 302 and an address generation unit 305 control DMA transfers between functional units of chip 100 and external memory 103. In the present embodiment, channel memory has eight 32-bit registers or entries, corresponding to 8 assigned channels for DMA operations. To initiate a DMA access to external memory 103 or an internal control register, the requesting device generates an interrupt to have CPU 150 write, over W bus 180a, a request into the channel memory entry assigned to the requesting device. The portion of external memory 103 accessed by DMA can be either local (i.e. in the address space of the present chip) or remote (i.e. in the address space of another chip).

Figure 3B:
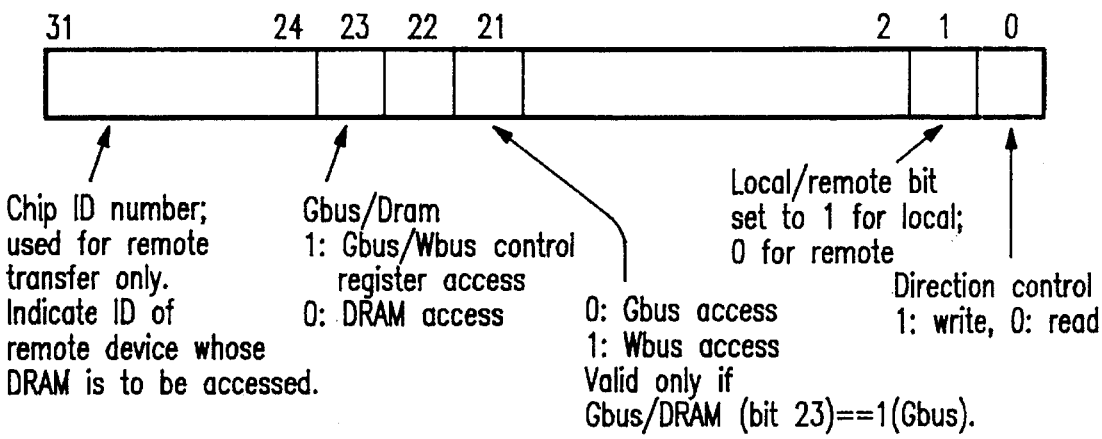
FIG. 3b show a bit assignment diagram for the channel memory entries of channel 1.
Figure 3C:
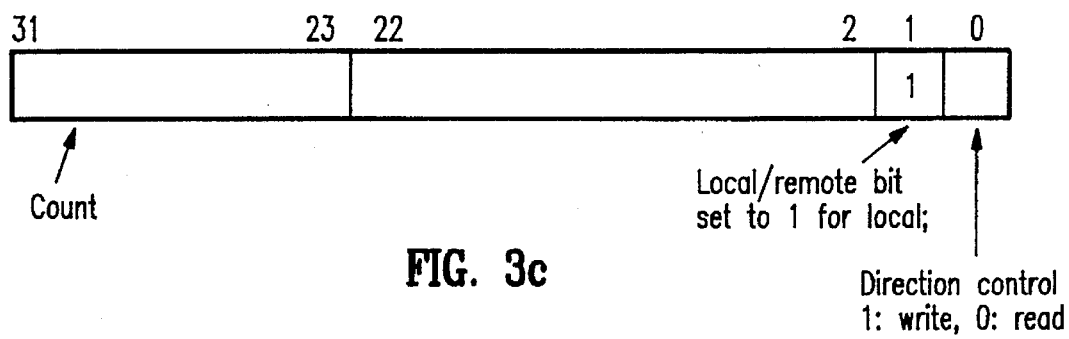
FIG. 3c show a bit assignment diagram for the channel memory entries of channels 0, and 3–7.
Figure 3D:
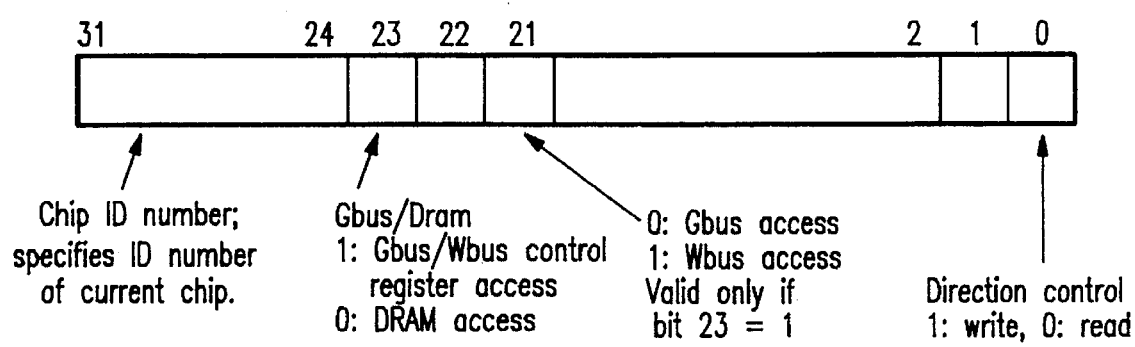
FIG. 3d shows a bit assignment diagram for the channel memory entry of channel 2.

In the present embodiment, channel 0 is reserved for preforming refresh operations of external memory 103. Channel 1 allows single-datum transfer between external memory 103 and RMEM 154. Channel 2 is reserved for transfers between host interface 102 and either external memory 103 or an internal control register. FIGS. 3*b* and 3*d* provide the bit assignment diagrams for channel memory entries of channels 1 and 2 respectively. Channels 3–7 are respectively assigned to data transfers between external memory 103 and (a) video bus 107, (b) video bus 108, (c) VLC FIFO 703 of VLC 109 and VLD 110, (d) SMEM 159, and (e) instruction memory 152. FIG. 3*c* provides the bit assignment diagram for each of the channel memory entries of channels 0 and 3–5 and 7. FIG. 3*e* provides the bit assignment diagram for the channel memory entries of channel 6, which is discussed in further detail below.

For all channel entries, bit 0 indicates whether the requested DMA access is a read access or a write access. In the channel memory entry of channel 1 (FIG. 3*b*), bits 31:24 are used to specify the "ID" of a "remote" chip, when the address space of the remote chip is accessed. If an access to the address space of a remote chip is requested, bit 1 is also cleared to '0'. In the channel memory entry of channel 1, bit 23 indicates whether the DMA access is to external memory 103 or to a control register of either global bus 120 or W bus 180*a*. When the access is to a control register of W bus 180*a*, bit 21 is also set. For channels 0, 3–7, bits 31:23 provide a count indicating the number of 32-bit words to transfer. For channels 3 and 4 (video buses 107 and 108), the count is a multiple of 16.

Referring back to FIG. 3*a*, external DRAM controller 313 maps the addresses generated by address generation unit 305 into addresses of external memory 103. DRAM controller 313 provides conventional DRAM control signals to external memory 103. The output signals of DRAM controller 313 are provided on memory address bus 105*b*.

In this embodiment, a word in external memory 103 or on host bus 101 is 32-bit long. However, in most internal registers, and on W bus 180*a*, a data word is 36-bit long. A priority interrupt encoding module 307 receives interrupt requests from functional units and generates interrupt vectors according to a priority scheme for CPU 150 to service. An interrupt is generated whenever a channel in channel memory 302 is empty and the channel's interrupt enable bit (stored in an interrupt control register) is set. In this embodiment, the interrupt vector is 4-bit wide to allow encoding of 16 levels of interrupt.

Transactions on global bus 120 are controlled by a state machine 304. Global bus 120, which is 32-bit wide, is multiplexed for address and data. During a valid address cycle, memory controller 104 drives an address onto global bus 120. In such an address, bit 6 of the 32-bit word (i.e. the seventh bit from the least significant end of the address) is a "read or write" bit which indicates whether the bus access reads from or write to global bus 120. The six bits to the right of the "read or write" bit constitute an address. By driving an address of a functional unit on to global bus 120, memory controller 104 selects the functional unit for the access. Once a functional unit is selected, the selection remains until a new address is driven by memory controller 104 on to the global bus. While selected, the functional unit drives output data or reads input data, according to the nature of the access, until either the GVALID signal is deasserted, or the GDATA signal is negated. The negated GDATA signal signifies a new address cycle in the next system clock period.

An arbitration scheme allows arbitration circuit 301 to provide fairness between non-real time channels, such as SMEM 159, and real-time channels, such as video ports 107 and 108, or VLC 109 (FIG. 1*a*). In general, a channel memory request from a functional unit is pending when (a) a valid entry of the functional unit is written in channel memory 302, (a) the mask bit (see below) of the functional unit in an enable register for the request is clear, and (c) the functional unit's request signal is asserted. For channels 3 and 7 (i.e. video port 107 and instruction memory 152), a request signal is not provided, and a valid entry in channel memory 302 suffices.

In this embodiment, the real-time channels have priority over non-real time channels. Arbitration is necessary when more than one request is pending, and occurs after memory controller 104 is idle or has just finishes servicing the last request. In this embodiment, each non-real time channel, other than RMEM, is provided with a mask bit which is set upon a completion of request, if another non-real time request is pending. All of the non-real time mask bits are cleared when no non-real time request is outstanding. Real time channels are not provided with mask bits. Thus, a real time channel request can always proceed, unless preempted by a higher priority request. DRAM refresh is the highest priority real time channel.

To support an MPEG-2 feature which allows motion estimation to be selectably based on either a frame (i.e. both odd and even fields) or one of the two fields, memory controller 104 allows video data transfer from external memory 103 to SMEM 159 either on a frame basis or on a field basis. Accordingly, bit assignment for the channel memory entry of channel 6, which is shown in FIG. 3*e*, allocates bit 1 for specifying whether a frame transfer ("frame DMA") or a field transfer ("field DMA") is desired. When a field DMA is selected, bit 3 of the channel memory entry specifies whether the odd field or the even field is desired. Field DMA is described in further detail below.

Also shown in FIG. 3*e* is the allocation of channel memory entry's bit 23 to indicate whether data transfer in "video capture" order (also known as "scan line" order) or "reference" order is desired. FIGS. 3*f*(i) and 3*f*(ii) show tiles (i.e. groups of four quad pels) 350 and 351 stored in "video capture" and "reference" orders, respectively. FIGS. 3*f*(i) and 3*f*(ii) each show a group of sixteen pixels arranged in a 4×4 configuration (i.e. four quadpels). In each of tiles 350 and 351, the shaded pixels belong to the even field, and the unshaded pixels belong to the odd field. The numerals in FIGS. 3*f*(i) and 3*f*(ii) labelling each pixel are the four least significant bits of the pixels' addresses in external memory 103. FIGS. 3*f*(i) and 3*f*(ii) show the orders in which the four quad pels of each tile would be accessed, if each tile is accessed in the order of contiguous DRAM addresses. Video capture and reference orders can be derived from each other by swapping the upper right quad pel with the lower left quad pel of each tile.

As discussed above, chip 100 of the present embodiment supports up to a total of 8 megabytes of external DRAM memory, arranged in four interleaved banks and addressed by 10-bit column and row addresses provided in a time-multiplexed manner over MAddr[9:0]. The four banks are selected by two row-address strobe signals (MRAS[1:0]) and two column address strobe (MCAS [1:0]) signals. Two output pins ("MAddr1H" and "MAddr1L") are provided in chip 100 for bit 1 of MAddr[9:0] to allow special memory access modes, such as the field DMA transfer mode described below. The row and column addresses together form a word address for a 32-bit word. Various modes of memory accesses to support video capture order and reference order accesses to external memory 103 are described in the Copending Application incorporated by reference above.

The present embodiment is designed for efficient retrieval of pixels by macroblocks. As discussed above, a macroblock is 16×16 array of pixels. For a color image, the brightness and the color information are conveyed by luminance ("Y") type pixels ("luma") and two chrominance types ("U" and "V" types) pixels ("chroma"). Luma are typically provided at twice the resolution of chroma. In the present embodiment, macroblocks are mapped to DRAM pages in the manner illustrated in FIG. 4f, so that an entire macroblock can be retrieved without crossing a DRAM page boundary. FIG. 4f shows, in the present embodiment, two horizontal rows 471 and 472 of macroblocks in an image frame, consisting of macroblocks 471-1, 471-2, . . . , 471-n and 472-1, 472-2, . . . , 472-n. The present embodiment maps rows 471 and 472 to corresponding DRAM pages 473 and 474. Because a complete row of macroblocks can be retrieved without crossing a DRAM page boundary, the arrangement shown in FIG. 4f efficiently exploits the faster access time available using page mode access to DRAMs of external memory 103. Luma are stored separately from chroma covering the same picture area. "U" and "V" chroma corresponding to the same picture area are, however, stored in external memory 103 in close proximity. In fact, as discussed below, corresponding "U" and "V" chroma are stored in external memory 103 separated by a fixed DRAM address offset (x40). FIG. 4g shows a labelling scheme for identifying tiles (4×4 pixels) of "U" type chroma pixels on an image. This labelling scheme facilitates the following description of the mapping between areas of the image and their corresponding storage locations in external memory 103. In FIG. 4a, each square (labelled $U^i_j$) represents a 4×4 "U" type chroma area which is the jth tile of "U" macroblock i. The corresponding "V" macroblock i, with "V" type tiles (labelled $V^i_j$) is stored in external memory 103 adjacent to "U" macroblock i in the manner shown in FIG. 4h. Further, FIG. 4h also shows that the "U" and "V" type macroblocks in the same row are stored within the same DRAM page. For example, adjacent macroblocks $U^C$, $U^1$, . . . , $U^{21}$ are stored in DRAM page 481 and adjacent macroblocks $U^{22}$, $U^{23}$, . . . $U^{43}$ are stored in the DRAM page 482.

The present embodiment provides, in accordance with the present invention, an input mode ("reference DMA") which reads tiles stored in the video capture order into SMEM 159 in reference order. To indicate a reference order DMA access, CPU 150 writes into channel memory 302 an entry specifying channel 6, with bit 23 reset (i.e. having value '0'). As shown above, bit 23 is also the least significant bit of the count field (bits [31:23]). Also, by convention, the value of the count field represents one less the number of words to transfer. Since the count for a DMA transfer is required to be a multiple of four, a '0' value at bit 23 of the channel memory entry is used to assert a control signal to the address generation circuit 305 to generate external DRAM addresses to access each tile's upper right quad pel ahead of its lower left quad pel (i.e. generating the least significant four bits of the external memory address in the sequence: '0000, '1010, '0100 and '1100, rather than: '0000, '0100, '1000 and '1100). The logic circuit for generating these sequences of DRAM addresses can be synthesized using a suitable logic synthesis computer program known in the art. To restore the count value, the circuit sets bit 23 when the channel memory entry is written into channel memory 302. FIG. 4a shows, the circuit for thus setting the count field and for generating an enable signal to indicate reference order access.

As shown in FIG. 4a, a 32-bit channel memory entry of channel memory 302, specifying channel 6, is received from w bus 180a. OR gate 402 sets bit 23 to '1' regardless of the value in bit 23. However, NAND gate 403 asserts an active low control signal "Ref_DMA_Enb" when bit 23 is '0' and control signal "Ch6wr_en" on lead 404 is '0'. Control signal "Ch6wr_en" indicates that channel 6 of channel memory 302 is to be written.

Field DMA modes transfer video data between SMEM 159 and external memory 103 in reference order. As described above, chip 100 provides two input/output pins MAddr1H and MAddr1L at bit 1 of memory address bus MAddr[9:0]. To allow frame DMA access, the upper and lower half words of a 32-bit word in external memory 103 are independently addressed. FIG. 4b shows a configuration 410 of chip 100 and one bank of external memory 103 which allows independent addressing of the upper and lower half words of a 32-bit wide external memory 103. In one embodiment, chip 100 supports memory interleaving operation using two banks of memory ("bank0" and "bank1"). To promote clarity, only bank0 of external memory 103, which receives a control signal. "CAS_0" as a chip-select signal, is shown in FIG. 4b. Bank1, which receives a control signal "CAS_1", is connected to chip 100 in a similar manner.

As shown in FIG. 4b, the upper and lower halves 103a and 103b of one bank of external memory 103 are coupled to the upper and lower 16 bits of 32-bit memory data bus 105a (Mdata[31:0]), respectively. Each half of external memory 103 receives bits MAddr[9:2,0] and either address bit MAddr1H or Maddr1L as address bits ADDR[9:2,0] and ADDR[1]. In this embodiment, each half of external memory 103 can be implemented by 256K×16 DRAM modules.

Under field DMA mode, memory addresses are generated by address generation circuit 305, which is modified by circuit 450 shown in FIG. 4c. As shown in FIG. 4c, multiplexer 452 passes both input values Addr1H and Addr1L at terminals 453 and 454 to pins MAddr1H (455) and MAddr1L (456), respectively, when control signal "Field" at terminal 451 is inactive. When control signal "Field" is active, indicating a field DMA type transfer, the output signals at MAddr1H and MAddr1L have opposite logic values. ADDR[1] has the value '0' for even fields and the value '1' for odd fields.

FIG. 4d shows the access pattern under a field DMA transfer for accessing pixels belonging to an even field in a macroblock 460. The numerals in macroblock 460 represent the byte address offsets from the starting address of macroblock 460 in external memory 103. In macroblock 460, pixels in the clear regions are pixels belonging to an even field, and pixels in the shaded regions are pixels belonging to an odd field. As mentioned above, under a field DMA transfer, bits MAddr1H and MAddr1L, provided to access the upper and lower half-words (i.e. bits [31:16] and bits [15:0]) are provided different values. Thus, the word address offsets of the upper and lower words are separated by two. For example, to fetch quad pel at byte address offsets 0, 1, A and B, the upper halfword is accessed by word address offset 0 and the lower halfword is accessed by word address 2. Consequently, the upper halfword accessed (word address offset 0) provides the two pixels stored at byte address offsets 0 and 1, and the lower halfword accessed (word address offset 2) provides the two pixels at byte address offsets A and B. Table 1a provides, as offset from the starting address of macroblock 460, the word address offsets for the upper and lower halfwords in the field DMA transfer of FIG. 4d (even field).

FIG. 4e shows the access pattern under a field DMA transfer for accessing pixels belonging to an odd field in a macroblock 460. As mentioned above, the numerals in macroblock 460 represent the byte address offsets from the starting address of macroblock 460 in external memory 103. In FIG. 4e, as in FIG. 4d, the pixels in the odd field are shown as the shaded pixels. The word address offsets of the upper and lower words are also separated by two, since under a field DMA transfer, address bits MAddr1H and MAddr1L are provided different values. Thus, to fetch the quad pel at byte address offsets 2, 3, 8 and 9, the upper halfword is accessed by word address offset 2 and the lower halfword is accessed by word address offset 0. Consequently, the upper halfword (accessed by word address offset 2) provides the two pixels stored at byte address offsets 8 and 9, and the lower halfword (accessed by word address offset 0) provides the pixels stored at byte address offsets 2 and 3. Table 1b provides,, as offset from the starting address of macroblock 460, the word address offsets for the upper and lower halfwords in the field DMA transfer of FIG. 4e (odd field).

In the present embodiment, motion estimation is performed in motion estimator 111, which is described in the Copending Application incorporated by reference above. In motion estimation, a motion vector represents pixels of a macroblock as a displacement of corresponding pixels in a reference picture area. To implement the MPEG-1 and the MPEG-2 standards, this embodiment derives a motion vector from a reference picture area of 20×20 pixels, for luma type pixels, and a reference picture area of 12×12 pixels, for chrominance type pixels.

As mentioned above, to facilitate retrieval of macroblocks, the present embodiment stores multiple adjacent macroblocks within the same horizontal row in the same DRAM page. In the present embodiment, a 20×20 luma reference picture area can be defined anywhere in the picture. Thus, fetching a 20×20 luma reference picture area necessarily requires crossing at least one DRAM page boundary, and in some instances, two page boundaries. As is known to one skilled in the art, in an access to a DRAM, an additional latency in memory access (called the "initial access time") is suffered whenever a DRAM page boundary is crossed. The present invention provides a hardware structure and a method for automatically controlling the computing of DRAM addresses for fetching a luma reference picture area, while minimizing the number of DRAM page boundaries crossed. The present embodiment also provides a control scheme described below, using this hardware structure, for generating addresses for fetching the 12×12 chroma reference picture areas. A "horizontal resolution" value in a DMA register is initialized to the specific horizontal size of the reference frame, and bit 1 of the entry in DMA channel 6 specifies whether a field mode or frame mode DMA access is desired. (A field mode access provides pixels half the resolution of pixels in a frame mode access).

FIG. 5k shows a block diagram of the reference fetch control hardware 500 for automatically reloading the DMA channel memory entry for channel 6 (SMEM 159). Fetch control hardware 500 transfers by DMA an entire reference picture area without firmware intervention. As shown in FIG. 5k, a control circuit 550 receives the current value in DMA channel memory entry (552) for channel 6 and the content of a control register 551 ("horizontal_resolution") to generate a value 553, representing the number of remaining DMA transfers required for transferring the remainder of the present reference picture area, and the next value (554) to be loaded into the DMA channel memory entry 552 for channel 6. When the completion of the current DMA transfer is detected, if the number of remaining DMA transfers is not zero, the value 554 is loaded into DMA channel memory entry 552 for channel 6 to initiate the next DMA transfer. The value in control register 551 represents the DRAM address offset between successive pages of DRAM memory. The control scheme implemented in control circuit 550 is discussed in further detail next.

FIG. 5a shows a bit-assignment of the channel memory entry for a DMA transfer fetching a reference picture area. As shown in FIG. 5a, bits 31:23 represent a 9-bit "count" field and bits 22:0 include a 21-bit DRAM word address, one bit indicating whether frame or field is accessed, and one bit indicating whether the DMA transfer is a read or a write access. For a luma transfer, as shown in FIG. 5b, the 9-bit count field includes three sub-fields CX, CY and CZ. Subfield CX is the 1's complement of a signed integer representing the number of 4×20 "columns" remaining to be fetched in the reference picture area; subfield CY is the 1's complement of a value representing the DRAM word address offset (in the Y direction) of the current 4×20 column from the DRAM word address at the DRAM page boundary. The various possible values for allowable DRAM word address offsets are shown in FIG. 5c. Cz represents the horizontal word offset within a tile.

For a luma reference fetch, the present embodiment fetches the reference picture area under microcode control and crosses one or two DRAM page boundaries, depending upon whether the DRAM address offset between the top leftmost pixel and the address of the closest DRAM page top boundary is between 0 to 6 (the "general case"), inclusive, or 7 (the "special case"). Under the general case, a top portion of the luma reference picture area is in one DRAM page, and the remaining portion of the luma reference picture area is in another DRAM page. The top portion represents a 20×n pixel area, n being an integer between 4 and 16, and the remaining portion being a 20×(20−n) pixel area. Under the special case, a 20×2 pixel area is provided in one DRAM page, a 20×16 pixel area is located in a second DRAM page, and the remaining 20×2 pixel area is provided in a third DRAM page.

An example of fetching the reference picture area under the general case is illustrated in FIG. 5d. In FIG. 5d, the top portion 501a of a macroblock 501 (an 8×20 pixel area) is located in a first DRAM page 502, with the top of portion 501a having an offset CY of 4. Correspondingly, the bottom portion 501b of macroblock 501 (12×20 pixel area) is located in a second DRAM page 503, with the bottom of portion 501b having an offset CY of 6. In FIG. 5d, the offsets CX in the X direction are also shown. To fetch macroblock 501, the DRAM address of the pixel at point 504 is loaded. A counter, which is initially loaded with the count field of the DMA channel memory entry (FIG. 5a), is used as a state register of a state machine which controls the generation of DRAM addresses by address generation circuit 305. This counter is incremented as each DRAM word (a quad pel) is read from DRAM. When the CY subfield of the counter reaches 7, the CX subfield is incremented, and the CY field is reset to the original offset of 4. When the CX subfield reaches zero, the fetch of luma pixels of portion 501a is complete. At that point, the counter is automatically reloaded with the a new count value, which has portion 501a's initial CX field and a CY field equal to 6 (i.e. 10 minus 4). The initial DRAM address for portion 501b is also reloaded in a DRAM address register. In one embodiment, the new value (new_ca) for the count field, and the beginning DRAM address (da) of bottom portion 501b are given by the equations (as expressed in the format of well known programming language "C"):

new_ca=(field? 71:67)+((orig_da & (field? 0x30 : 0x38)) >>2)
da=(orig_da & (0x7fffc7¦ (field<<3)))+res>>4 where (i) "field" is a boolean state variable indicating whether the reference picture area is derived from a single field of a frame, or both fields of the frame; (ii) orig_da is the DRAM word address of the top-leftmost luma pixel in the reference picture area; (iii) res>>4 provides the DRAM address offset between two DRAM pages; and (iv) the ANDing of the (orig_da) with 0x7fffc7 provides the DRAM address the nearest top DRAM page boundary of the DRAM page which includes top portion 501a.

Fetching a luma reference picture area under the special case is illustrated by FIG. 5e. Reference picture area under the special case can be seen as two general case reference picture area fetches, fetching a 20×16 reference picture area in the first leg (i.e. portions 511a and 511b), and a 20×4 reference area in the second leg (i.e. portions 511c and 511d). Under the special case, the counter in the state machine for controlling DRAM address generation is reloaded three times automatically, so as to fetch sequentially each of portions 511a, 511b, 511c and 511d. In this embodiment, the new count value (new_ca) and the beginning DRAM address (da) for fetching portion 511b are given by the equations:

new_ca=field ? 75: 77 da=(orig_da & (0x7fffc7¦ (field<<3)))+res>>4

The new count value (new_ca) and the DRAM address for fetching portion 511c are given by the equations:

new_ca=79 da=orig_da+res>>4

The new count value (new_ca) and the beginning DRAM address (da) for fetching portion 511d are given by the equations:

new_ca=(field ? 67:65)

da=(orig_da & (0x7fffc7¦ (field<<3)))+res>>5

The mechanism for fetching the chroma reference picture area is more complicated. In this embodiment, the 12×12 chroma reference picture area must specify its top-leftmost chroma pixel at a tile boundary, rather than the quad pel boundary, as required in the fetching of a luma reference picture area. The bit assignments of the count field in the DMA channel memory entry for a chroma reference picture area fetch is provided in FIG. 5f. As shown in FIG. 5f, the count field includes subfields CX, CUV, CY, and CZ. Subfield CX is a 5-bit signed integer indicating the width (in tile units) of the remaining row of macroblocks in the current chroma reference picture area being transferred. Subfield CUV is a bit indicating whether a U or V type chroma tile is being transferred. Subfield CY is a 2-bit unsigned integer (between 0 and 3, inclusive) indicating which of the four tiles in a macroblock is currently being transferred. Since the CX subfield of the count field is initially −3, rather than −5, as in the fetching of luma reference picture area, the initial value of the count field serves to identify that the required fetch operation is a chroma reference picture area fetch.

Since the top leftmost pixel of a 12×12 chroma reference picture area can be located on any tile boundary, the control for generating DRAM addresses under a chroma reference picture area fetch can fall into one of four cases, depending upon which of the four tiles in a macroblock of the image space is the top-leftmost tile (in image space) in the 12×12 reference picture area. These four cases, are illustrated by FIGS. 5g(i), 5h(i), 5i(i), and 5j(i) respectively. In each of FIGS. 5g(i), 5h(i), 5i(i) and 5j(i), the shaded region represents the 12×12 chroma reference picture area to be transferred. The corresponding locations for these chroma reference picture areas in external DRAM memory 103 are indicated by the shaded areas in FIGS. 5g(ii), 5h(ii), 5i(ii) and 5j(ii) respectively. DRAM address are generated from the control circuit 550 controlling DRAM address generation and an internal DRAM address register of control circuit 550 providing an initial address in the current DRAM page. As in the fetching of a luma reference picture area, the counter is initially loaded the count field of the DMA channel memory entry for channel 6. The "U" and "V" chroma are fetched simultaneously by toggling bit CVU, so as to generate alternately DRAM addresses for corresponding "U" and "V" type tiles for the same location in image space. As mentioned above, corresponding "U" and "V" type tiles are separated from each other by a DRAM address offset of x40.

As shown in FIGS. 5g(ii), 5h(ii), 5i(ii) and 5j(ii), in order to fetch the shaded chroma tiles in corresponding FIGS. 5g(i), 5h(i), 5i(i) and 5j(i), non-contiguous DRAM addresses are generated not only at the DRAM page boundary, but also within the DRAM page. For example, as shown in FIG. 5h(ii), non-contiguous DRAM addresses are generated between fetching tile $U^0_1$ and $U^0_3$. In this embodiment the tiles of a macroblock are stored in consecutive addresses For example $U^0_0$, $U^0_1$, $U^0_2$, and $U^0_3$ are stored in consecutive addresses, which are offset from the top of the DRAM page by a value DY ranging from 0 to 7. It is observed, since the top left-most chroma of the reference picture area must be specified in this embodiment at a tile boundary, the locations at which non-contiguous DRAM addresses are generated in the top portion of the reference picture area (i.e. the portion of a reference picture area above the DRAM page boundary to be crossed) each have a DY value of either 3 or 7. For example, whereas in FIG. 5g(ii), a non-contiguous address is generated at the location where DY equals to 7 (i.e. at the page boundary), FIG. 5h(ii) shows an example where a non-contiguous address is generated after fetching tile $U^0_1$, at a location where DY equals 3. Further, to distinguish between the cases corresponding to FIGS. 5g(i) and 5i(i), both the count field and the initial DRAM addresses must be used. Thus, in this embodiment, the characteristic count of 47 (decimal) is used to indicate a chroma reference fetch. The offset of the initial DRAM address from the address of the top of the DRAM page is detected to guide the state machine for generating the DRAM addresses for the chroma fetch. In this embodiment, to fetch the lower portion of the chroma reference picture area, the count field and the DRAM address are reloaded in the DMA channel memory entry in accordance with the following equations:

new_ca=BIT(org_da,4) ? 47:43 da=(orig_da & 0x7fffc7)+(res>>3)+(orig_da & x20)

where (i) BIT(a,b) is a function extracting, from the bit-pattern of "a", the boolean value BIT(a,b) of the bit at position "b"; and (ii) ANDing the value "x20" with into the DRAM address ("da") indicates to the state machine that the lower portion of a reference chroma fetch is to be performed.

In this embodiment, the completion of the chroma reference fetch in a DRAM page is not indicated by CX=0. As shown in FIG. 5g(ii), the completion of the chroma reference fetch on a given DRAM page does not end at a page boundary. Instead, a state variable "bot", which is defined by the equation:

bot=(da & xFE) & (count<0)

The bot variable is tested to decide whether the condition for the completion of the chroma reference fetch, or the condition for reloading of DMA channel memory entry to fetch the lower portion of the chroma reference picture area, has occurred. Completion of the chroma reference fetch is indicated by evaluating the state variable "end_tfer" using the following equation:

end_tfer=((count & x1F9)==x1F9) && bot

As each U type tile is fetched, the corresponding V type tile is fetched using a shadow register whose count (sh_count) is provided by the equation:

sh_count=count | 8

The corresponding address (v_da) for the V tile is provided by the equation:

v_da=da+x40

CPU 150 includes instruction memory 152, RMEM 154, byte multiplexor 155, ALU 156, MAC 158, and SMEM 159, which includes AMEM 160. CPU 150 of the present embodiment can be implemented using a CPU such as that disclosed in the Copending Application incorporated by reference above. MPEG-1 preferred an 8-bit precision. However, MPEG-2 calls for up to 11-bit precision. In an integrated circuit implementation, however, the additional precision of MPEG-2 can result in a much greater silicon area than the corresponding MPEG-1 implementation. Thus, for practical reasons, the present embodiment does not provide 11-bit precision for MPEG-2. However, to better accommodate MPEG-2's additional precision, the present embodiment provides a 9-bit DC term. To allow the present embodiment to perform under both MPEG-1 and MPEG-2 standards, clipping of the 9-bit DC term is not performed under the MPEG-2 standard to avoid loss of the additional precision.

FIG. 6a shows a circuit for bypassing clipping under MPEG-2. As shown in FIG. 6a, quantized coefficients are provided by quantizer 604 as 18-bit fixed point number, each comprising a 10-bit signed integer portion and an 8-bit fraction portion. In the present embodiment, for each MPEG-2 8×8 matrix, the DC coefficient and the first AC coefficient are packed in a 36-bit word as shown in FIG. 6b. In FIG. 6b, the DC coefficient is provided in the bits $S_{DC}$, DC and the 8-bit quantities "DC" and "DC fraction". Bit $S_{DC}$, bit DC and the 8-bit "DC" quantity form respectively the signed bit, and the 9-bit magnitude of the 10-bit signed integer portion of the DC coefficient. The 8-bit "DC fraction" is the fraction portion of the DC coefficient. AC coefficients are similarly provided.

In the present embodiment, the DC coefficients of each 8×8 pixel matrix are differentially encoded by firmware. Differential encoding expresses the DC coefficient as a value relative to the value of the DC coefficient in the 8×8 matrix immediately preceding the current 8×8 pixel matrix, rather than the full precision of the current DC coefficient. The differential encoding yields a 9-bit signed DC term. At the same time, the precision of the AC coefficients is limited to 9 bits in clipper circuit 602. In MPEG-2 encoding, clipping of DC coefficients is bypassed, and the 9-bit DC coefficient is forwarded to byte packer circuit 603 to pack the DC coefficient with three 9-bit AC coefficients in a 36-bit word. The packed 36-bit word is shown in FIG. 6c. In FIG. 6c, $S_{DC}$, $S_{AC1}$, $S_{AC2}$ and $S_{AC3}$ are the signed bits of the DC and AC coefficients.

The present embodiment also supports MPEG-2 "oddification". Under MPEG-1, each DCT coefficient of an 8×8 matrix is required to be oddified for performance shown in performance studies. Under MPEG2, however, only the last coefficient of the 8×8 pixel block is oddified, when the running checksum of the 8×8 pixel matrix is even. To provide support for both MPEG-1 and MPEG-2 operations, the DMUL (dequantization) instruction is modified to implement the following equations:

Under MPEG-1, for an intra macroblock, the elements of the 8×8 matrix are dequantized by:

$$DeQ_{ij} = \frac{2 * DCT_{ij} * QP * Qm_{ij}}{16} - \text{Sign}(DeQ_{ij})$$

where $DCT_{ij}$ is a quantized DCT coefficient with indices i and j in the 8×8 matrix; $DeQ_{ij}$ is the corresponding dequantized DCT coefficient; sign(a) is 1 if "a" is less than zero, and 0 otherwise; QP is a quantization scale, which has a value between 1 and 31, inclusive, for MPEG-1; and $Qm_{ij}$ is element (i, j) of the quantization matrix.

For a non-intra macroblock under MPEG-1, the elements of the 8×8 matrix are dequantized by:

$$DeQ_{ij} = \frac{((2 * DCT_{ij}) + \text{sign}(DCT_{ij})) * QP * Qm_{ij}}{16} - \text{sign}(DeQ_{ij})$$

Under MPEG-2, however, an intra macroblock, the elements of the 8×8 matrix are dequantized by:

$$DeQ_{ij} = \frac{2 * DCT_{ij} * QP * Qm_{ij}}{32}$$

Under MPEG-2, for a non-intra macroblock, the elements of the 8×8 matrix are dequantized by:

$$DeQ_{ij} = \frac{((2 * DCT_{ij}) + \text{sign}(DCT_{ij})) * QP * Qm_{ij}}{32}$$

The oddification of a MPEG-2 macroblock is performed by firmware, which keeps a running checksum on the dequantized DCT coefficient of the 8×8 pixel block.

FIG. 6d shows the data flow of the DMUL instruction in CPU 150. As shown in FIG. 6d, 9-bit coefficients (DC or AC coefficients) arrives at bus 632 to be unpacked from the format of FIG. 6c. An unpacker 621 represents a 9-bit DCT coefficient on bus 633 as the 18-bit format (i.e. 10-bit signed integer and 8-bit fraction) of FIG. 6b. The 18-bit DCT coefficient is then biased by ½ in adder 622. The resulting sum on bus 634 is then multiplied by the product 634 of a corresponding 8-bit quantization value 635, a 5-bit quantization scaling factor 636 and, in MPEG-1, the value ⅔16. The most significant 2 bits and the least significant 10 bits of the 36-bit resulting product 637 are then discarded. A rounding circuit 623 receives the 24-bit result 637. In rounding circuit 623, under MPEG-1, if the resulting 24-bit value 637 is positive, −16 is added to the 24-bit value 637 to compensate for truncation errors. Otherwise, if resulting 24-bit value 637 is negative, a 15 is added to 24-bit value 637. The least significant 4 bits of the rounded result are then discarded to provide a 20-bit result 638, which is clipped to 12 bits (clipper 640) according to the MPEG standards. Under MPEG-1, oddifying circuit 641 oddifies each non-zero, non-zero DC element. Left-shifter 642 left-shifts the result to provide eight additional fractional bits.

The above detailed description is provided to illustrate the specific embodiment of the present invention and is not intended to be limiting. Many variations and modifications are possible within the scope of the present invention. The present invention is set forth in the following claims.

I claim:

1. A central processing unit in a video signal processing integrated circuit for an image processing operation, said image processing operation including a step of dequantizing elements of a matrix of discrete cosine transform (DCT) coefficients, said central processing unit comprising:
   a multiplier adapted for computing, for each DCT coefficient of said matrix of discrete cosine transform, the product of said DCT coefficient, an element of a dequantization matrix corresponding to said DCT coefficient, and a scaling factor from a dequantization scaling matrix corresponding to said DCT coefficient;
   an oddification circuit, receiving said product from said multiplier, for providing an oddified value obtained by oddifying said product when said product is even; and
   a selector circuit, receiving said product from said multiplier and said oddified product from said oddification circuit, for selecting, in accordance with a predetermined video processing standard, whether said product from said multiplier or said oddified product from said oddified product is provided as an output value of said central processing unit.

2. A central processing unit, as in claim 1, further comprising means for storing an accumulated checksum, wherein said selector circuit selects as said output value of said central processing unit, for a predetermined one of said DCT coefficients, said oddified product, when said accumulated checksum is of a predetermined parity.

3. In a central processing unit in a video signal processing integrated circuit for an image processing operation, said image processing operation including a step of dequantizing elements of a matrix of discrete cosine transform (DCT) coefficients, a method comprising:
   computing, for each DCT coefficient of said matrix of discrete cosine transform, the product of said DCT coefficient, an element of a dequantization matrix corresponding to said DCT coefficient, and a scaling factor from a dequantization scaling matrix corresponding to said DCT coefficient;
   computing, in an oddification circuit receiving said product from said multiplication step, an oddified value obtained by oddifying said product when said product is even; and
   selecting, in a selector circuit receiving said product from said multiplication step and said oddified product from said oddification circuit, in accordance with a predetermined video processing standard, which of said product from said multiplier or said oddified product from said oddified product is provided as an output value of said central processing unit.

4. A method, as in claim 3, further comprising the step of maintaining an accumulated checksum, wherein said step of selecting selects as said output value of said central processing unit, for a predetermined one of said DCT coefficients, said oddified product, when said accumulated checksum is of a predetermined parity.

* * * * *